United States Patent [19]

Suzuki et al.

[11] Patent Number: 5,477,357
[45] Date of Patent: Dec. 19, 1995

[54] LIQUID CRYSTAL DISPLAY DEVICE HAVING A MANAGEMENT SYMBOL PATTERN FORMED ON A SUBSTRATE

[75] Inventors: Masahiko Suzuki, Mobara; Katsuhiko Yarita, Ichihara; Hirobumi Kunito; Jun Kikumoto, both of Mobara, all of Japan

[73] Assignee: Hitachi, Ltd., Tokyo, Japan

[21] Appl. No.: 124,187

[22] Filed: Sep. 21, 1993

[30] Foreign Application Priority Data

Sep. 21, 1992 [JP] Japan ................... 4-250964

[51] Int. Cl.⁶ .................. G02F 1/1335; G02F 1/3333
[52] U.S. Cl. ........................... 359/67; 359/79
[58] Field of Search ...................... 359/67, 59, 79

[56] References Cited

U.S. PATENT DOCUMENTS

| | | | |
|---|---|---|---|
| 4,704,559 | 11/1987 | Suginoya et al. | 359/59 |
| 4,855,806 | 8/1989 | Parks et al. | 357/59 |
| 5,028,122 | 7/1991 | Hamada et al. | 350/333 |

FOREIGN PATENT DOCUMENTS

| | | | |
|---|---|---|---|
| 3140907 | 5/1983 | Germany | 359/67 |
| 1-234827 | 9/1989 | Japan | 359/87 |
| 2-21612 | 1/1990 | Japan . | |
| 4-43317 | 2/1992 | Japan . | |
| 4-77715 | 3/1992 | Japan . | |

Primary Examiner—William L. Sikes
Assistant Examiner—Charles Miller
Attorney, Agent, or Firm—Antonelli, Terry, Stout & Kraus

[57] ABSTRACT

Management symbols, such as the type, lot number and production number of an active matrix liquid crystal display panel, can be displayed without any increase in the number of manufacturing steps. A Cr management symbol NO formed at a first patterning step is coated with a gate insulating film GI so that it will not be removed at the time of Cr etching another layer for forming the source and drain electrodes. The management symbol is drawn on the photoresist RST by making use of an X-Y plotter so that different symbols can be easily formed for individual panels.

12 Claims, 19 Drawing Sheets

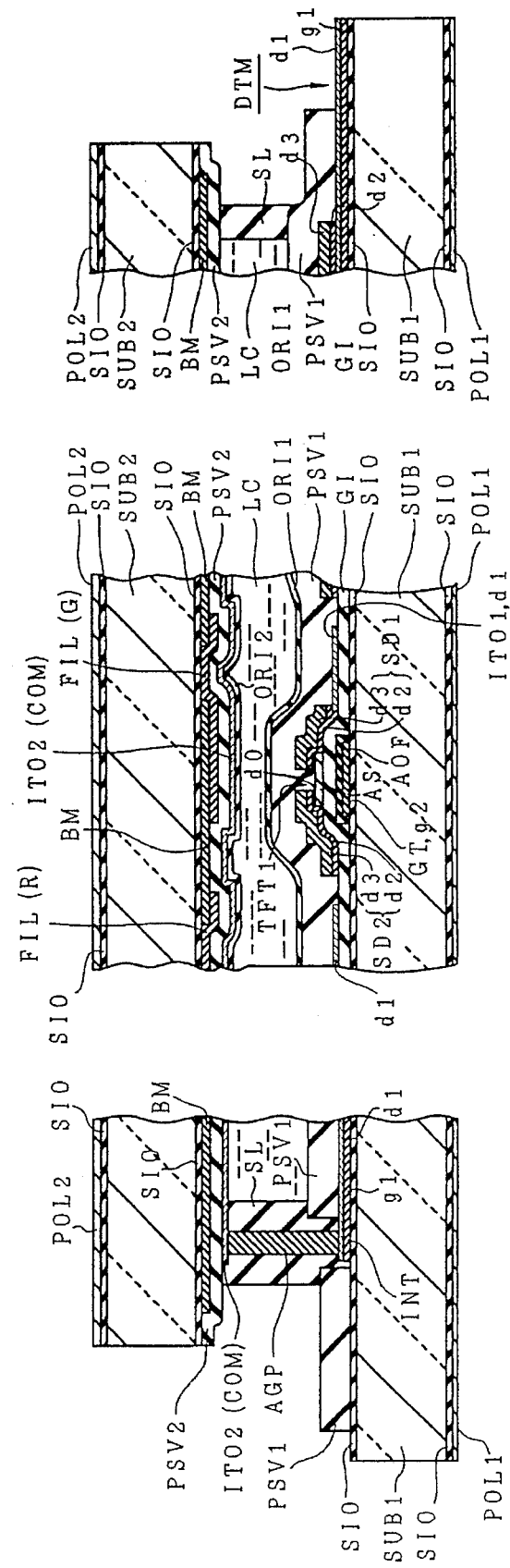

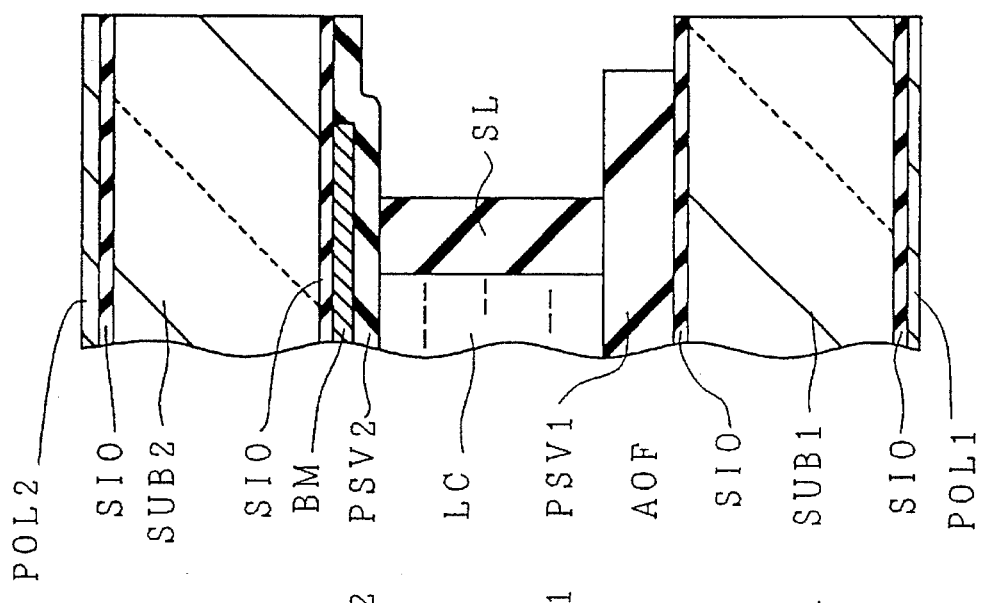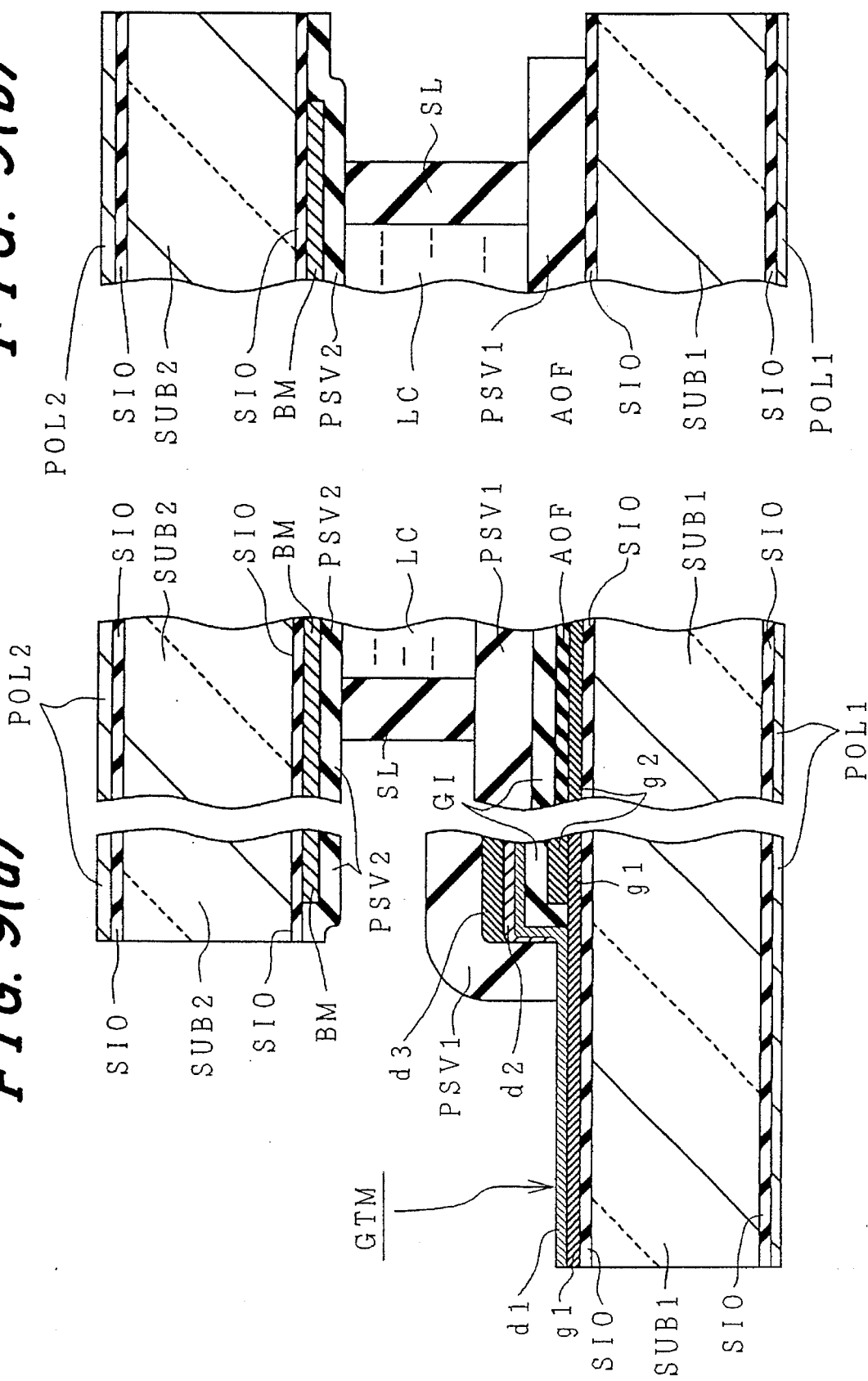

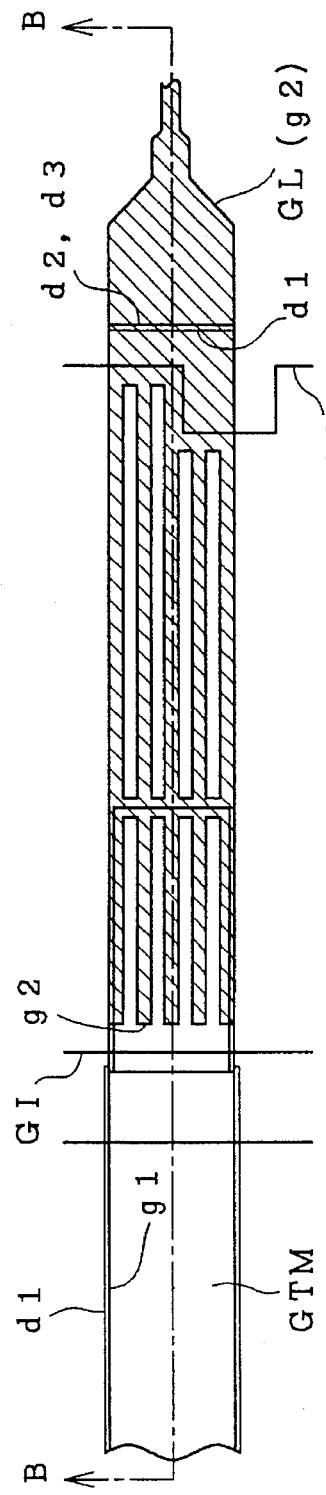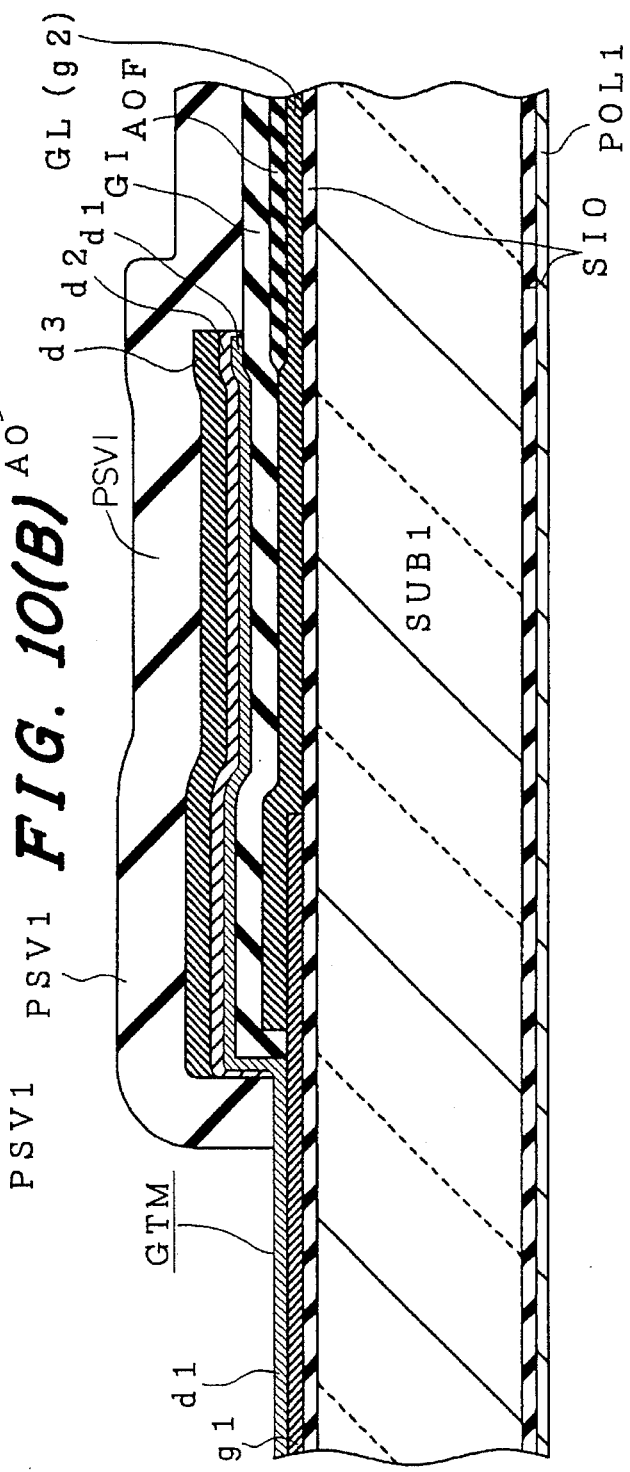
FIG. 10(A)
FIG. 10(B)

LIQUID CRYSTAL DISPLAY DEVICE HAVING A MANAGEMENT SYMBOL PATTERN FORMED ON A SUBSTRATE

BACKGROUND OF THE INVENTION

The present invention relates to a liquid crystal display device having a thin film transistor and, more particularly, to an active matrix type liquid crystal display device using a thin film transistor or the like.

The active matrix type liquid crystal display device is equipped with non-linear elements (or switching elements) respectively corresponding to a plurality of pixel electrodes arrayed in the matrix shape. Since a liquid crystal of each pixel is theoretically driven at all times (at the duty ratio of 1.0), the active type device has a better contrast than the so-called "simple matrix type device" which uses a time sharing drive method, and so this technology is indispensable especially in a color liquid crystal display device. The switching elements are representatively exemplified by thin film transistors (TFT).

Examples of the active matrix type liquid crystal display device using a thin film transistor are disclosed in Japanese Patent Laid-Open No. 309921/1988 and in "12.5 type active matrix color liquid crystal display adopting a redundant construction" on pp. 193 to 210 of Nikkei Electronics, issued on Dec. 15, 1986, by NIKKEI MCGRAW-HILL, for example.

SUMMARY OF THE INVENTION

It is convenient in the handling and distribution of the liquid crystal display device or the like during manufacture and after shipping if its display panel is displayed with the type, lot number and management number, such as a manufacturers number, of the liquid crystal display device.

The ordinary semiconductor or liquid crystal display device is patterned with its product type when its individual layer patterns are formed by photographic treatments. However, each time the management numbers are attached for the individual lots or products, the mask for the photographic treatment has to be impractically prepared and replaced.

An object of the present invention is to provide a liquid crystal display device having a thin film transistor, which is displayed with a management symbol of the product.

Another object of the present invention is to provide a liquid crystal display device having a thin film transistor, which is capable of displaying the product management number for each product.

According to one embodiment of the present invention, there is provided a liquid crystal display device having a thin film transistor, which is formed with the production number management pattern simultaneously with the formation of a Cr external terminal at a first pattern forming step, and in which the management pattern is covered with a gate insulating layer or film.

Since the management pattern is covered with the gate insulating film, it is not removed together at a subsequent step of etching the source and so drain Cr films, and the number of steps is not increased for that operation.

BRIEF DESCRIPTION OF THE DRAWINGS

FIGS. 8(a), 8(b) and 8(c) are section views respectively showing the pixel portion of the matrix at the center and in the vicinities of the panel corners and the video signal terminal portion at the two sides.

FIGS. 9(a) and 9(b) are section views respectively showing the scanning signal terminal at its lefthand side and the panel edge portion having no external terminal at its righthand side.

FIG. 10(A) is a top plan view showing the vicinity of the connecting portion of the gate terminal GTM and FIG. 10(B) is a section along line B—B in FIG. 10(A) showing the gate wiring line GL.

DESCRIPTION OF THE PREFERRED EMBODIMENTS

Figure 1A:
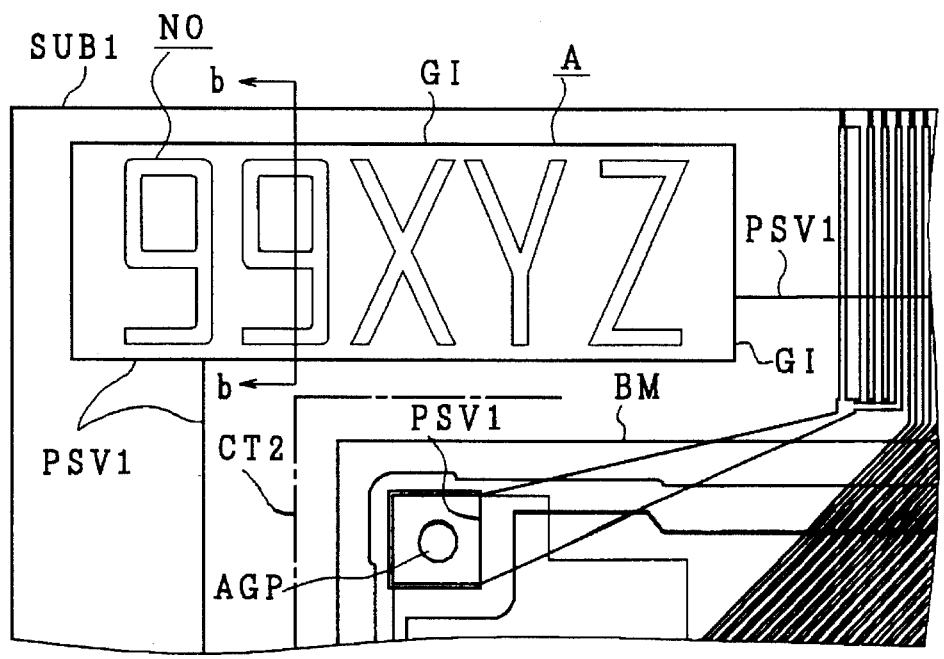
FIGS. 1(a)–1(c) are diagrams showing one embodiment of the present invention.

The present invention and its other objects and novel features will become apparent from the following description to be made with reference to the accompanying drawings.

Active Matrix Liquid Crystal Display Devices

Here will be described an embodiment in which the present invention is applied to an active matrix type color liquid crystal display device. In the accompanying drawings, portions having identical functions will be identified with common reference numerals, and their repeated description will be omitted.

Summary of Matrix Portions

Figure 2:
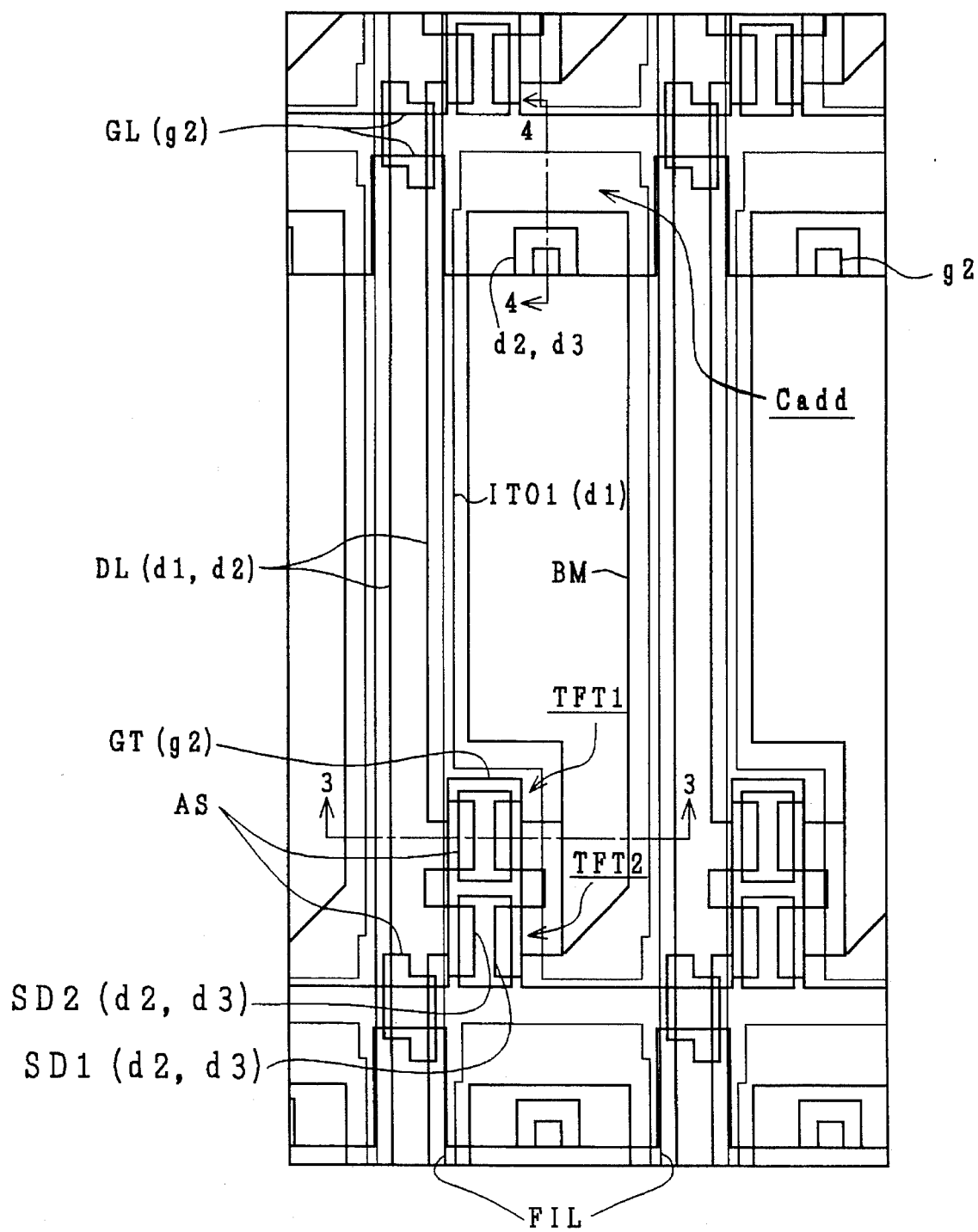
FIG. 2 is a top plan view showing an essential portion of one pixel and its periphery of the liquid crystal display portion of an active matrix type color liquid crystal display device according to the present invention.
Figure 3:
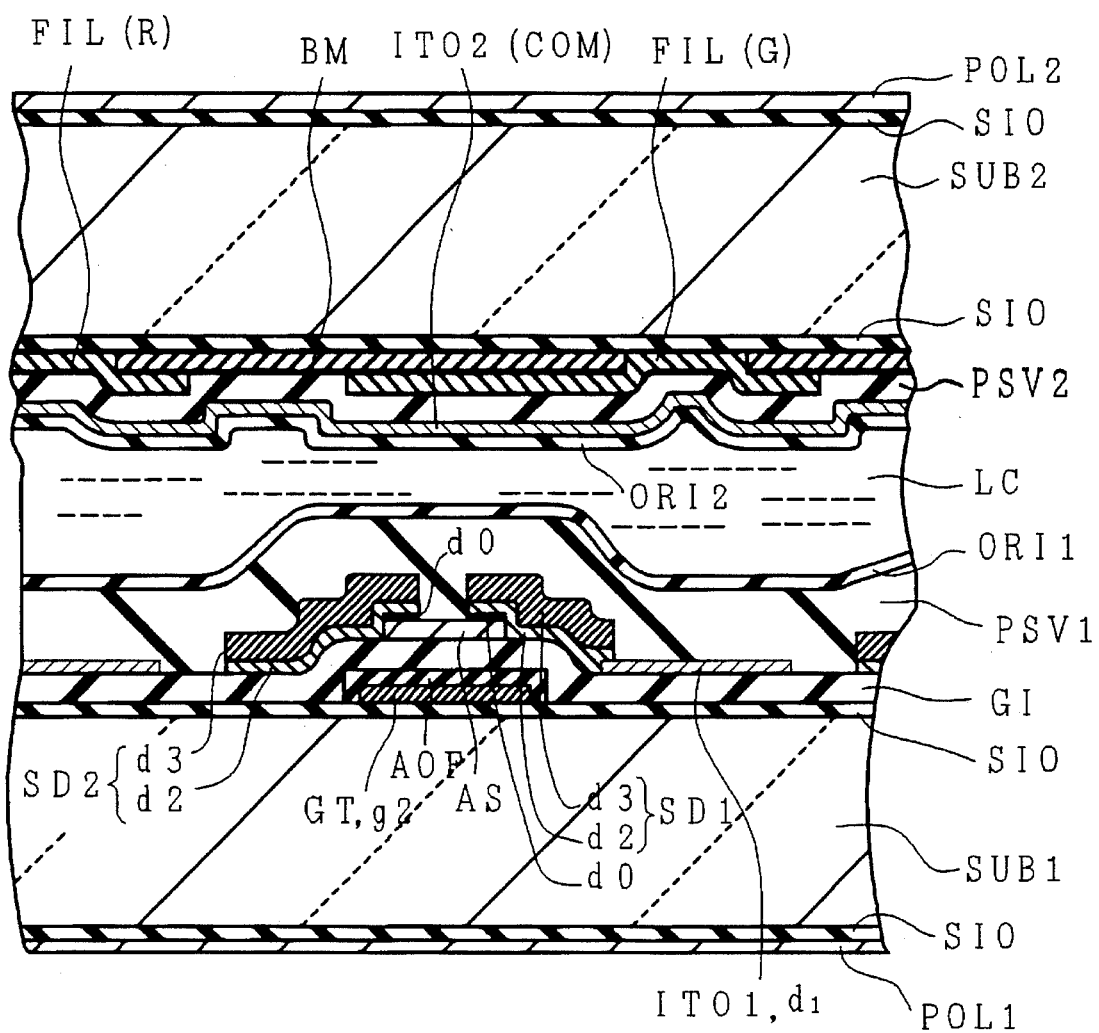
FIG. 3 is a section taken along line 3—3 of FIG. 2 and showing one pixel and its periphery.
Figure 4:
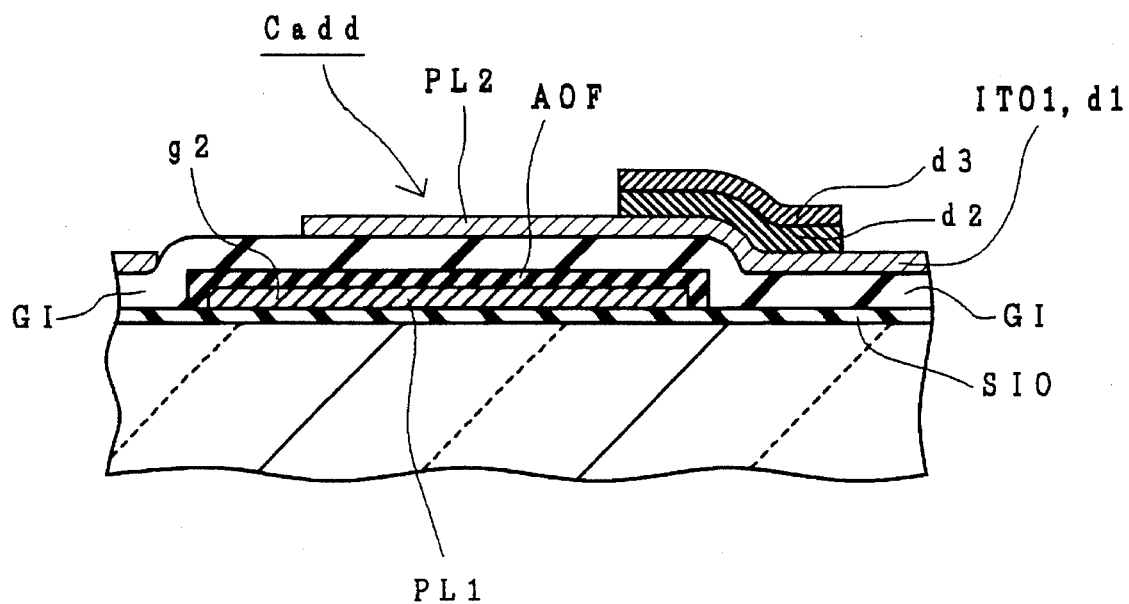
FIG. 4 is a section taken along line 4—4 of FIG. 2 and showing the additional capacity element Cadd.

FIG. 2 is a top plan view showing one pixel of the active matrix type color liquid crystal display device according to the present invention together with the periphery of the pixel; FIG. 3 is a section taken along line 3—3 of FIG. 2; and FIG. 4 is a section taken along line 4—4 of FIG. 2.

As shown in FIG. 2, each pixel is arranged in an intersecting region (i.e., the region defined by four signal lines), which is defined by two adjoining scanning signal lines (e.g., gate signal lines or horizontal signal lines) GL and two adjoining video signal lines (e.g., drain signal lines or vertical signal lines) DL. Each pixel includes a thin film transistor TFT, a transparent pixel electrode ITO1 and a hold capacitance element Cadd. The scanning signal lines GL are extended transversely, as shown, and are arranged longitudinally in a plurality of lines. The video signal lines DL also are extended longitudinally and are arranged transversely in a plurality of lines.

As shown in FIG. 3, the pixel is formed with the thin film transistor TFT at the side of a lower transparent glass substrate SUB1 with respect to a liquid crystal layer LC and with a color filter FIL and a shielding black matrix pattern BM at the side of an upper transparent glass substrate SUB2. Each of the transparent glass substrates SUB1 and SUB2 has its two faces formed with silicon oxide films SIO by dipping treatment or the like.

On the inner surface (as located at the side of the liquid crystal LC) of the upper transparent glass substrate SUB2, there are sequentially laminated a shielding film BM, a color filter FIL, a passivation film PSV2, a common transparent pixel electrode ITO2 (or COM) and an upper orienting film ORI2.

Summary of Matrix Peripheral Portions

Figure 5:
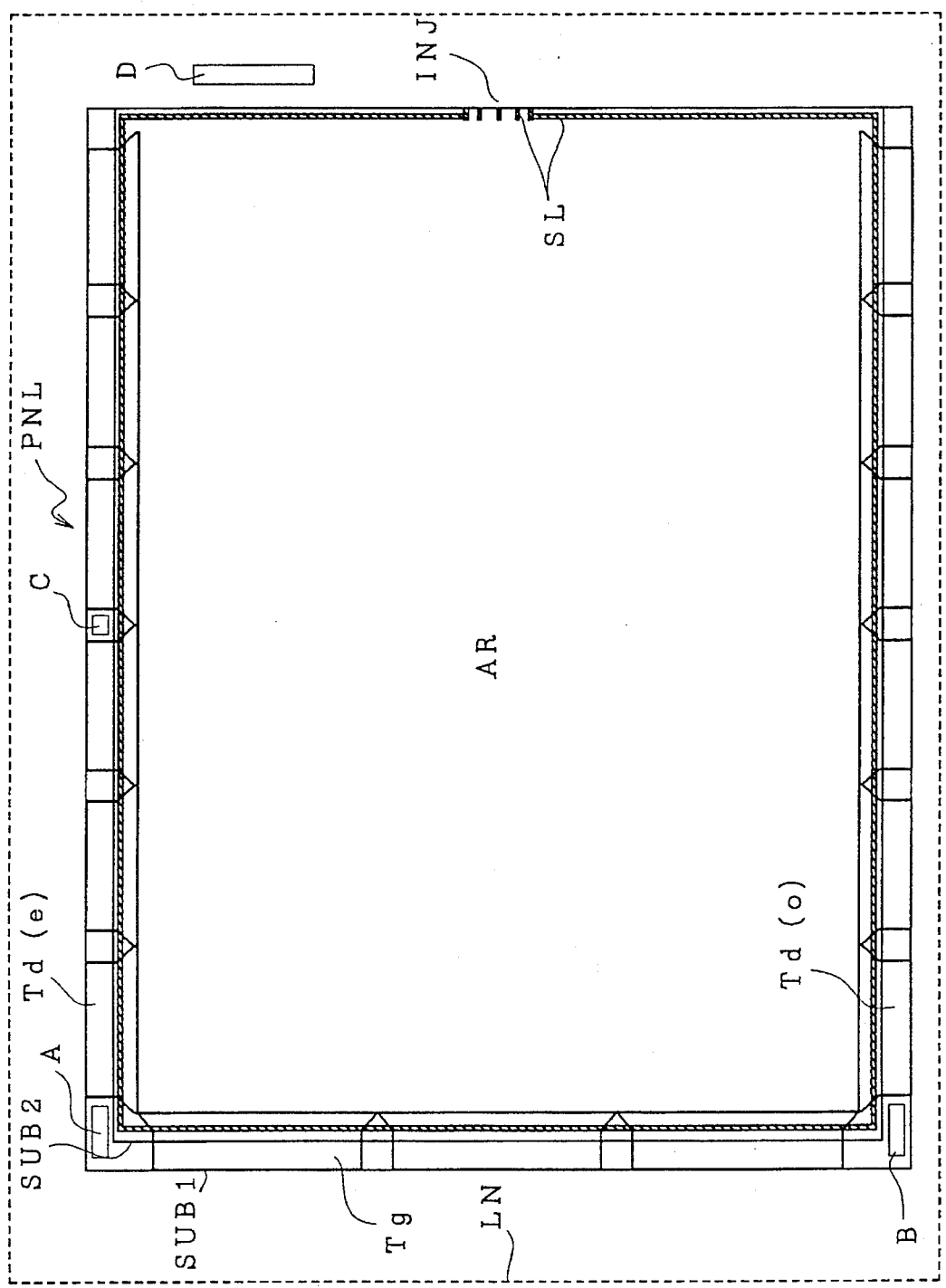
FIG. 5 is a top plan view of the construction of the display panel in the vicinity of the matrix.
Figure 6:
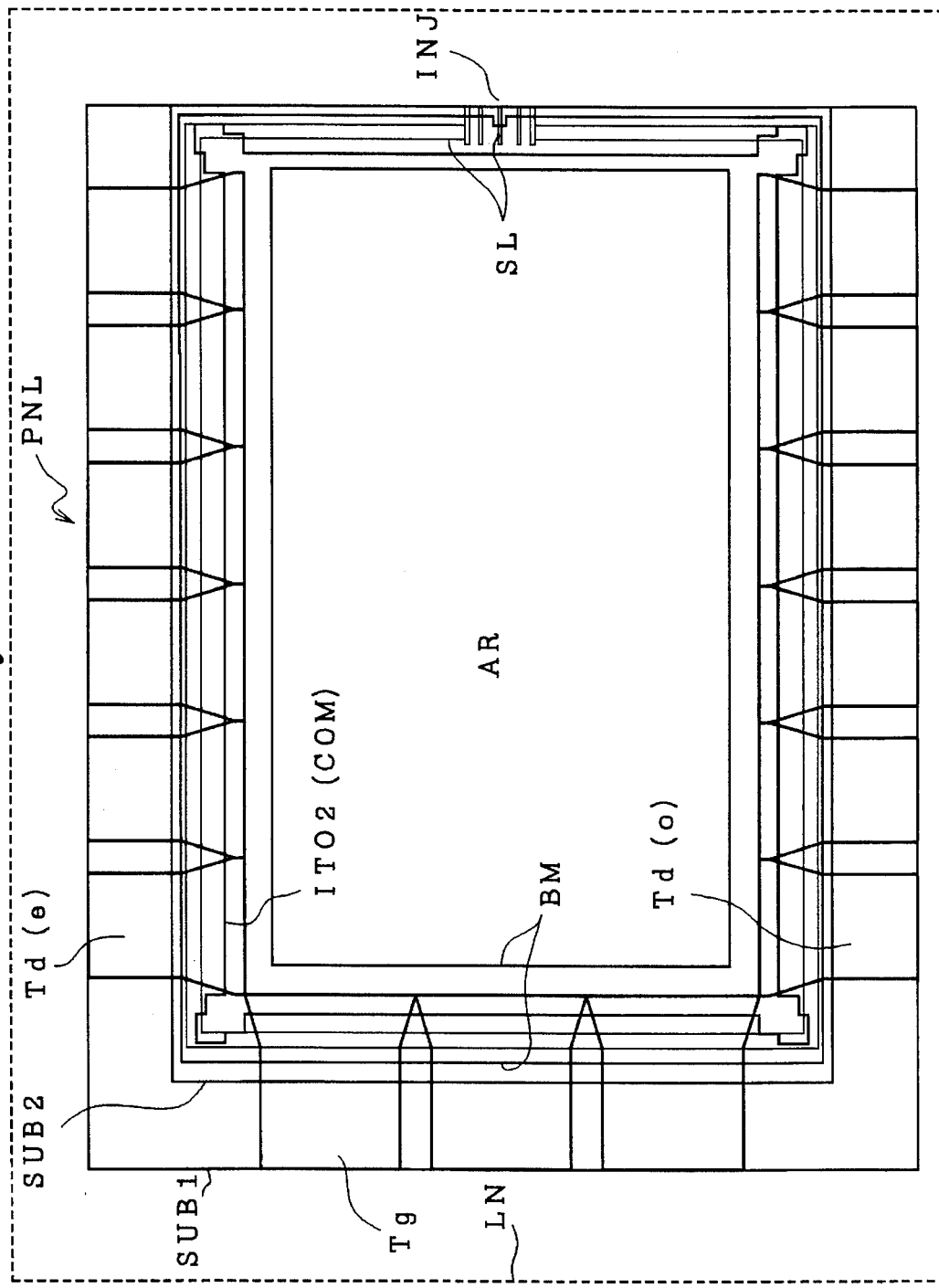
FIG. 6 is a panel top plan view of the peripheral portion of FIG. 5 illustrated rather exaggeratedly and more specifically.
Figure 7:
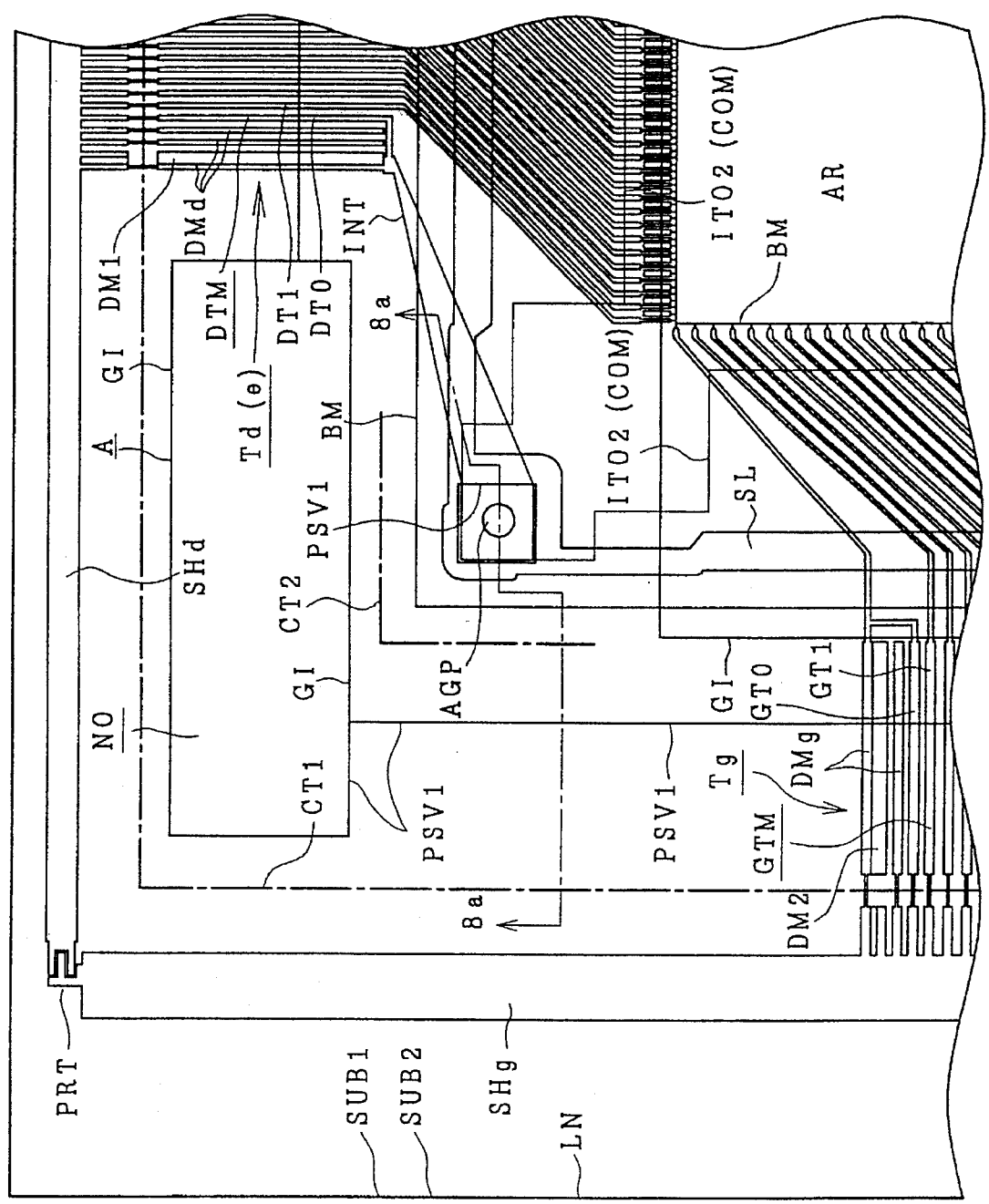
FIG. 7 is an enlarged top plan view showing the corner of the display panel including the electrically connected portion of upper and lower substrates.

FIG. 5 is a top plan view showing an essential portion of a display panel PNL having the upper and lower glass substrates SUB1 and SUB2 at the periphery of a matrix (AR); FIG. 6 is an exaggerated top plan view showing the peripheral portion; and FIG. 7 is an enlarged top plan view showing the vicinity of a seal portion SL corresponding to the lefthand upper corner of the panel of FIGS. 5 and 6. On the other hand, FIG. 8(a) presents the section of FIG. 3, as located at the center; FIG. 8(b) is a section taken along line 8a– 8a of FIG. 7, as Located at the lefthand side; and FIG. 8(c) is a section showing the vicinity of an external terminal DTM to be connected with a video signal driving circuit, as located at the righthand side. Likewise, FIG. 9(a) presents a section in the vicinity of an external terminal to be connected with a scanning circuit, as located at the lefthand side, and FIG. 9(b) is a section in the vicinity of the seal portion having no external terminal, as located at the righthand side.

Figure 18:
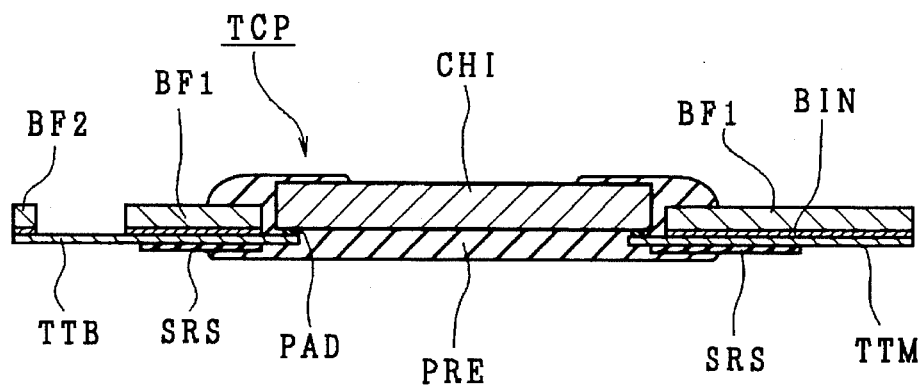
FIG. 18 is a section showing the structure of the tape carrier package TCP in which the integrated circuit chip CHI constituting the driving circuit is packaged in the flexible wiring substrate.
Figure 19:
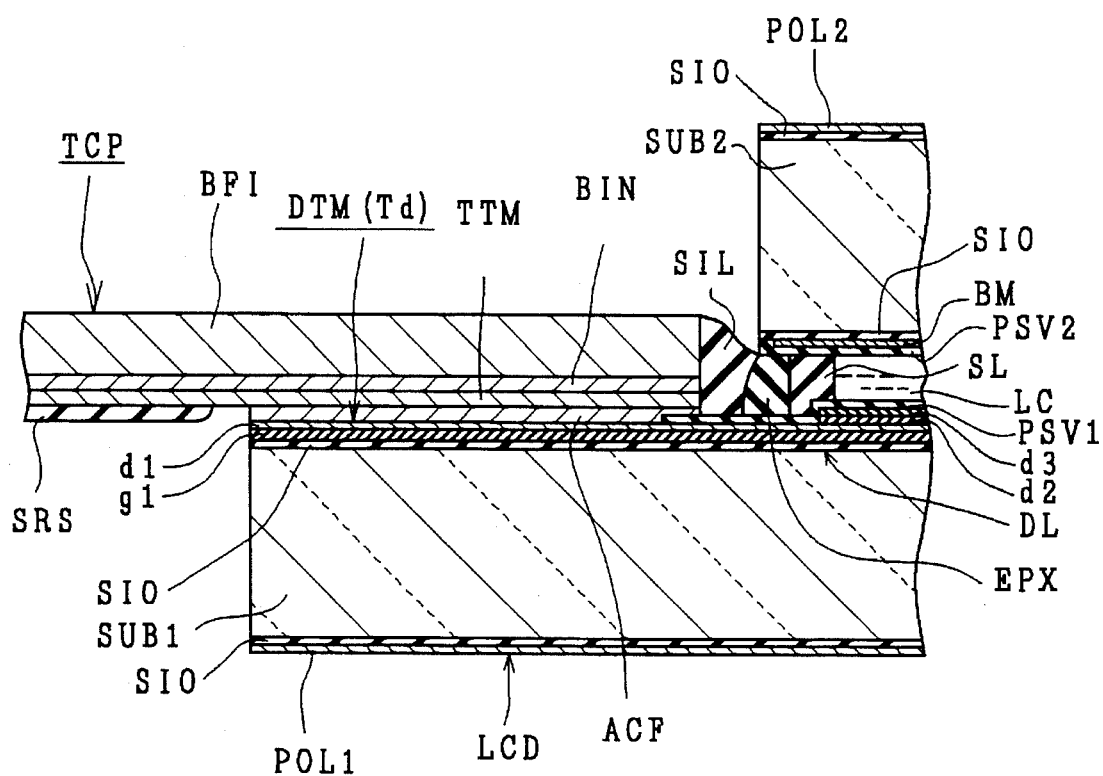
FIG. 19 is a section of an essential portion showing the state in which the tape carrier package TCP is connected with the video signal circuit terminal DTM of the liquid crystal display panel PNL.

In the manufacture of this panel, the glass substrate is cut through only one step; that is for a smaller size, one glass substrate for a plurality of devices are simultaneously worked before it is divided, so as to improve the throughput, and for a larger size, one glass plate standardized for all kinds is worked for the various kinds before its size is reduced, so as to use the manufacturing facilities in common. FIGS. 5 to 7 show an example of the latter category. Of these, FIGS. 5 and 6 show the upper and lower substrates SUB1 and SUB2 after being cut, and FIG. 7 shows the same before they are cut. Letters LN designate edges of the two substrates before being cut, and characters CT1 and CT2 designate the lines along which the substrates SUB1 and SUB2 are to be respectively cut. In either case, in the completed status, the upper substrate SUB2 is so restricted inside of the lower substrate SUB1 at the portions in which external terminal sets Tg and Td (although their suffixes are omitted) exist that the external terminal sets (as located at the upper and lower sides and the lefthand side) may be exposed to the outside. These terminal groups Tg and Td are individually identified by gathering the later-described scanning circuit connecting terminals GTM and video signal circuit connecting terminals DTM and their lead-out lines at the unit of a tape carrier package TCP (as shown in FIGS. 18 and 19) in which an integrated circuit chip CHI is packaged. The lead-out lines from the matrix Of the individual sets to the external terminals are inclined toward the two ends. These inclinations are made so that the terminals DTM and GTM of the display panel PNL may match the array pitch of the packages TCP and the terminal pitch of each package TCP.

The transparent glass substrates SUB1 and SUB2 are formed therebetween along their edges with a seal pattern SL for sealing the liquid crystal LC, excepting a liquid crystal sealing port INJ. This seal pattern SL is made of an epoxy resin or the like. The common transparent pixel electrode ITO2 of the upper transparent glass substrate SUB2 is connected in at least its portion with a lead-out line INT formed at the side of the lower transparent glass substrate SUB1, at the four corners of the panel, by silver paste AGP in the present embodiment. This lead-out line INT is formed at the same manufacturing step as that of the later-described gate terminal GTM and drain terminal DTM.

The orientation films ORI1 and ORI2, the transparent pixel electrode ITO1 and the common transparent pixel electrode ITO2 have their individual layers formed inside of the seal pattern SL. Polarization plates POL1 and POL2 are respectively formed over the outer surfaces of the lower transparent glass substrate SUB1 and the upper transparent glass substrate SUB2. The liquid crystal LC is confined in the region which is partitioned by the seal pattern SL between the lower orientation film ORI1 and the upper orientation film ORI2 for setting the orientations of the liquid crystal molecules. The lower orientation film ORI1 is formed over the passivation film PSV1 at the side of the lower transparent glass substrate SUB1.

This liquid crystal display device is assembled by laminating the various layers separated at the sides of the lower transparent glass substrate SUB1 and the upper transparent glass substrate SUB2; by forming the seal pattern SL at the side of the substrate SUB2; by superposing the lower transparent glass substrate SUB1 and the upper transparent glass substrate SUB2; by injecting the liquid crystal LC into the port INJ of the seal member; by sealing up the injection port INJ with an epoxy resin; and by cutting the upper and lower substrates.

Features of the Embodiment

Figure 1B:
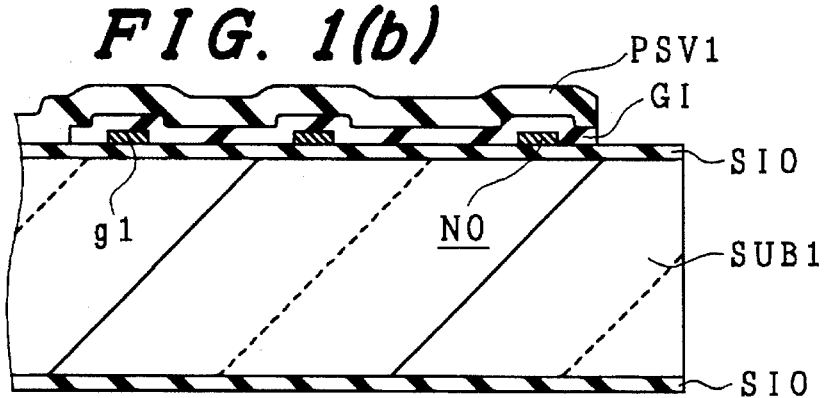
Figure 1C:
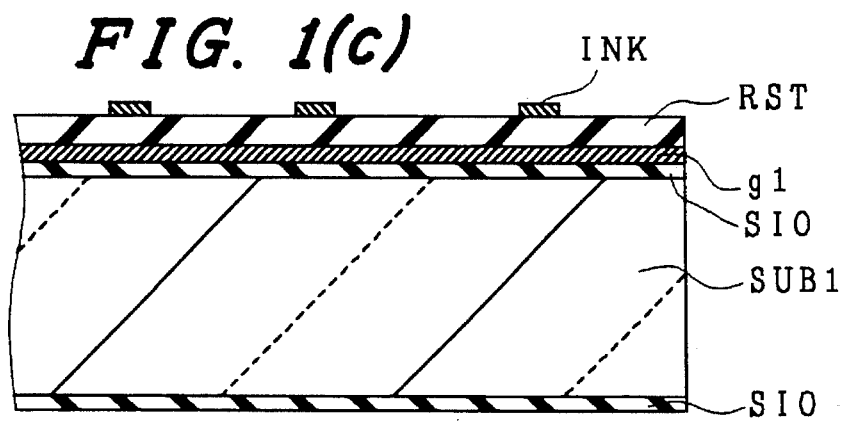

Here will be described the features and essential points of the present embodiment with reference to FIGS. 1(a)–(c), FIG. 5 and FIG. 7. The description of the Active Matrix Liquid Crystal Display Device presented heretofore with reference to FIGS. 2–4 should be referred to for the individual specific constructions and the relations to other portions. FIG. 1(a) enlarges and shows a portion of FIG. 7, i.e., a management symbol pattern; FIG. 1(b) is a section taken along line b—b of FIG. 1(a); and FIG. 1(c) is a section corresponding to FIG. 1(b) when in a photographic treatment.

Reference letter A in FIG. 1(a) designates a management number display region, and letters NO designate a management symbol displayed in the display region. In the specific example "99XYZ" of the management symbol NO, the less significant two figures "YZ" indicate the type of the liquid crystal display panel, figure "X" indicates a lot number, and numerals "99" indicate the panel number of the lot. Hence, the symbols in the present embodiment express the so-called "type of the device" and the production number together.

The management symbol NO is formed of a later-described Cr conductive layer g1 and is coated with later-described gate insulating layer GI and the passivation film PSV1. Thus, when a later-described Cr conductive layer d2 is to be etched, the management symbol NO is kept from being removed because of the presence of the gate insulating layer GI. At the time of etching the SiN passivation film PSV1, moreover, the SiN gate insulating film GI coating the management symbol NO is not removed so that the management symbol NO is protected from the outside by the two insulating films.

The management symbol is not limited to the lefthand upper corner A, as shown in FIG. 5, but may be formed, for example, in the lefthand lower corner B, in a space C between the drain connecting terminal sets Td, or in a portion D to be finally cut off.

Here will be described a method of forming the management symbol pattern With reference to of FIG. 1(c).

Letters RST designate a positive photoresist which is applied to the whole surface of the substrate SUB1 and is dried and baked, as shown. Letters INK designate an ink layer drawn on the photoresist with the variable figure of the lot number "X" and the substrate number "99" in the present embodiment using an X-Y plotter. On the other hand, the type "YZ" to be fixed in the same kind of device has its pattern determined together with the terminal sets Td and Tg by a photo mask. If exposed under this state, the management number NO, the terminal pattern and the like are shielded from the light so that they are left even after the subsequent developing step.

By thus drawing the management number with the use of the plotter, the management number can be easily changed for individual panels.

Incidentally, in case the photoresist RST used is of the negative type, there is a merit that the terminals are not short-circuited even if dust is left on the photo mask. In this case, the photo mask may be transparent inside of the region A except for the letters "YZ", but are black outside except for the patterns such as the terminal portions, so that the management symbol NO is indicated as blanked letters.

On the other hand, in case the photoresist RST used is of the positive type as in the present embodiment, there is the advantage that the terminals will not be short-circuited even if dust is left on the photo mask. Since the management symbol NO is displayed not in blank, but as ordinary letters, there is another merit that the symbol is clearly visible especially in case the material used is not black, such as when made of Cr.

Thin Film Transistor TFT

Reverting to FIGS. 2 and 3, there will be provided a description in detail of the construction of the TFT substrate at the side of the SUB1.

The thin film transistor TFT operates to have its source-drain channel resistance decreased, if its gate electrode GT is fed with a positive bias, and increased if the bias is zero.

Each pixel is redundantly equipped with a plurality of (e.g., two) thin film transistors TFT1 and TFT2. Each of the thin film transistors TFT1 and TFT2 is constructed to have a substantially equal size (e.g., a channel length and a channel width) and is formed of the gate electrode GT, the gate insulating film GI, an i-type semiconductor layer AS made of i-type (i.e., intrinsic type having no conduction type determining impurity doped) amorphous silicon (Si), and a pair of electrodes including a source electrode SD1 and a drain electrode SD2. Incidentally, the source and the drain are intrinsically determined by their bias polarity. In the circuit of this liquid crystal display device, the polarity is inverted during the operation, and it should be understood that the source and the drain are interchanged during the operation. In the description to be made, however, one of the electrodes is conveniently fixed as the source whereas the other is provided as the drain.

Gate Electrode GT

The gate electrode GT is formed to protrude vertically from the scanning signal line GL (i.e., branched in the form of letter "T"). The gate electrode GT protrudes across the active region of each of the thin film transistors TFT1 and TFT2. The thin film transistors TFT1 and TFT2 have their individual gate electrodes GT formed integrally (as the common electrode) so as to merge into the scanning signal line GL. In the present embodiment, the gate electrodes GT are formed of a single-layered second conductive film g2. This second conductive film g2 is made of an aluminum (Al) film formed by the sputtering method, for example, and an anodized film AOF of Al is formed over the aluminum film.

This gate electrode GT is made sufficiently larger to cover the i-type semiconductor layer AS completely (as viewed from the bottom) thereby to shield the same from any ambient light or back light.

Scanning Signal Line GL

The scanning signal line GL is formed of the second conductive film g2. This second conductive film g2 of the scanning signal line GL is formed during the same manufacturing step as that of the second conductive film g2 of the gate electrode GT and is integrated with the same. This scanning signal line GL is also formed over the anodized film AOF.

Insulating Film GI

The insulating film GI is used together with the gate electrode GT in the thin film transistors TFT1 and TFT2 as the gate insulating film for applying an electric field to the semiconductor layer AS. The insulating film GI is formed over the gate electrode GT and the scanning signal line GL. As the insulating film GI, there is selected a silicon nitride film which is formed by the plasma CVD, for example, to have a thickness of 1,200 to 2,700 angstroms (e.g., 2,000 angstroms in the present embodiment). The film GI is formed, as shown in FIG. 7, to enclose the entirety of the matrix portion AR and has its peripheral portion removed to expose the external terminals DTM and GTM. The insulating film GI contributes to the electrical insulation of the scanning signal line GL and the video signal line DL.

I-Type Semiconductor Layer As

In the present embodiment, the i-type semiconductor layer AS is formed as an independent island in the thin film transistors TFT1 and TFT2 and is made of amorphous silicon to have a thickness of 200 to 2,200 angstroms (e. g., about 2,000 angstroms in the present embodiment). A layer d0 is an N(+) type amorphous silicon semiconductor layer doped with phosphor (P) for ohmic contact and is left in the portion which is formed therebelow with the i-type semiconductor layer AS and thereunder with a conductive layer d2 (or d3).

The i-type semiconductor layer AS is formed in the intersecting portion (or the crossover portion) between the scanning signal line GL and the video signal line DL. The i-type semiconductor layer AS of this intersecting portion reduces the short-circuiting between the scanning signal line GL and the video signal line DL.

Transparent Pixel Electrode ITO1

Transparent pixel element electrode ITO1 constitutes one of the pixel element electrodes of the liquid display part.

The transparent pixel electrode ITO1 is connected with both the source electrode SD1 of the thin film transistor TFT1 and the source electrode SD1 of the thin film transistor TFT2. As a result, even if a defect occurs in either of the thin film transistors TFT1 and TFT2, this defect can be remedied by cutting a suitable portion with a laser beam if it exerts adverse effects, or otherwise by leaving it as it is because the other thin film transistor is operating normally. The transparent pixel electrode ITO1 is formed of the first conductive film d1, which is made of a transparent conductive film (i.e., Indium-Tin-Oxide: ITO or nesa film) by the sputtering method to have a thickness of 1,000 to 2,000 angstroms (e.g., about 1,400 angstroms in the present embodiment).

Source Electrode SD1 and Drain Electrode SD2

The source electrode SD1 and the drain electrode SD2 are individually formed of the second conductive film d2 contacting with the N(+)-type semiconductor layer d0 and the third conductive layer d3 formed over the former.

The second conductive film d2 is made of a chromium (Cr) film by the sputtering method to have a thickness of about 500 to 1,000 angstroms (e.g., about 600 angstroms in the present embodiment). This Cr film is formed to have a thickness not exceeding about 2,000 angstroms, because a high stress is established if it is made thick. This Cr film is formed to improve the contact with the N(+)-type semiconductor layer d0 and to prevent the Al material of the third conductive film d3 from diffusing into the N(+)-type semiconductor layer d0 (so as to act as the so-called "barrier layer"). In addition to the Cr film, the second conductive film d2 may be exemplified by a film of a refractory metal (e.g., Mo, Ti, Ta or W) or a film of a refractory metal silicide (e.g., $MoSi_2$, $TiSi_2$, $TaSi_2$ or $WSi_2$).

The third conductive film d3 is formed to have a thickness of 3,000 to 5,000 angstroms (e.g., about 4,000 angstroms in the present embodiment) by sputtering Al. This Al film can be made to have less stress and a larger thickness than the Cr film and can act to reduce the resistances of the source electrode SD1, the drain electrode SD2 and the video signal line DL and to ensure the ride over the step (which is caused by the gate electrode GT or the i-type semiconductor layer AS (i.e., to improve the step coverage).

The N(+)-type semiconductor layer d0 is removed, after the second conductive film d2 and the third conductive film d3 have been patterned in a common mask pattern, either by using the same mask or by using the second conductive film d2 and the third conductive film d3 as the mask. Specifically, the N(+)-type semiconductor layer d0 left over the i-type semiconductor layer AS is removed in a self-alignment operation at its portions other than those of the second conductive film d2 and the third conductive film d3. At this time, since the N(+)-type semiconductor layer d0 is etched through all of its thickness, the i-type semiconductor layer AS also may have its surface portion etched slightly, but this etching depth may be controlled with control of the etching time period.

Video Signal Line DL

The video signal line DL is formed of the second conductive film d2 and the third conductive film d3, which are shared with the source electrode SD1 and the drain electrode SD2.

Passivation Film PSV1

Over the thin film transistor TFT and the transparent pixel electrode ITO, there is formed the passivation film PSV1. This passivation film PSV1 is formed mainly to protect the thin film transistor TFT from moisture or the like and is made of a highly transparent and moisture-resistant material. The passivation film PSV1 is formed of a silicon oxide or nitride film by a plasma CVD apparatus, for example, to have a thickness of about 1 μm.

The passivation film PSV1 is formed to enclose the entirety of the matrix portion AR, as shown in FIG. 7, and has its peripheral portion removed to expose the external terminals DTM and GTM to the outside. The passivation film PSV1 is further removed at its portion in which the common electrode COM at the side of the upper substrate SUB2 is connected with the external terminal connecting lead-out line INT of the lower substrate SUB1 by the silver paste AGP. In respect of the thickness relation, the passivation film PSV1 is made thicker so as to ensure its passivating effect, and the gate insulating film GI is made thinner to reduce the mutual conductance gm of the transistors. As shown in FIG. 7, therefore, the passivation film PSV1 having a high passivation effect is made sufficiently larger than the gate insulating film Gi that it can passivate its peripheral portion as wide as possible.

Shielding Film BM

The upper transparent glass substrate SUB2 is formed with the shielding film BM for protecting the i-type semiconductor layer AS against the external light or back light. The closed polygonal contour of the shielding fill BM, as shown in FIG. 2, indicates an aperture which is not formed therein with the shielding film BM. This shielding fill BM is made of an aluminum film, a chromium film or the like, having a high shielding property against the light, and is formed in the present embodiment of a chromium fill having a thickness of about 1,300 angstroms by the sputtering method.

As a result, the i-type semiconductor layer AS of each of the thin film transistors TFT1 and TFT2 is sandwiched between the upper shielding fill BM and the lower larger gate electrode GT so that it is shielded from the external natural light or the back light. The shielding film BM is formed in a grating shape (or the so-called "black matrix") around each pixel for partitioning the effective display area of one pixel. As a result, each pixel has its contour cleared with the shielding film BM to improve the contrast. In short, the shielding film BM has two functions, i. e., the shielding function for the i-type semiconductor layer AS and the function of a black matrix.

Since the edge portion (i.e., the righthand lower portion of FIG. 2) of the transparent pixel electrode ITO1 at the root portion of the rubbing direction is also shielded by the shielding film BM, a domain, if any, is established in that portion, and is invisible so that the display characteristics are not deteriorated.

The shielding film BM is also formed in a frame shape in the peripheral portion, as shown in FIG. 6, to have its pattern merging into that of the matrix portion of FIG. 2, which is formed of a plurality of dots. The shielding film BM in the peripheral portion is extended to the outside of the seal portion SL, as shown in FIGS. 6 to 9(b), to protect the matrix portion against a leakage light such as the reflected light coming from a real machine, such as a personal computer. On the other hand, the shielding film BM is terminated about 0.3 to 1.0 mm inside of the edges of the substrate SUB2 while being clear of the cut regions of the substrate SUB2.

Color Filter FIL

The color filter FIL is striped with repetitions of red, green and blue colors in positions opposed to the pixels. The color filter FIL is made rather large to cover the entirety of the transparent pixel electrode ITO1, and the shielding film BM is formed sufficiently inside of the peripheral edge of the transparent pixel electrode ITO1 as to overlap the edge portion of the transparent pixel electrode ITO1.

The color filter FIL can be formed by the following method. At first, the upper transparent glass substrate SUB2 is formed over its surface with a coloring base of an acrylic resin, which is removed, except for a red filter forming region, by the photolithography technology. After this, the coloring base is dyed with a red dye and fixed to form a red filter R. Subsequently, a red filter G and a blue filter B are sequentially formed by repeating similar steps.

Passivation Film PSV2

The passivation film PSV2 is formed to prevent the dye of the color filter FIL from leaking into the liquid crystal LC. This passivation film PSV2 is made of a transparent resin material, such as an acrylic resin or an epoxy resin.

Common Transparent Pixel Electrode ITO2

The common transparent pixel electrode ITO2 is arranged to face the transparent pixel electrode ITO1, which is disposed for each pixel at the side of the lower transparent glass substrate SUB1, and the optical state of the liquid crystal LC is varied in response to the potential difference (or the electric field) between each pixel electrode ITO1 and the common transparent pixel electrode ITO2. This common transparent pixel electrode ITO2 is adapted to be fed with a common voltage Vcom. In the present embodiment, this common voltage Vcom is set to an intermediate DC potential between a drive voltage Vdmin at the minimum level and a drive voltage Vdmax at the maximum level, but may be fed with an AC voltage in case the supply voltage of an integrated circuit to be used in the video signal driving circuit is to be halved. Incidentally, the top plan shape of the common transparent pixel electrode ITO2 is presented in FIGS. 6 and 7.

Structure of Hold Capacitance Element Cadd

The transparent pixel electrode ITO1 is so formed to overlap the adjoining scanning signal line GL at its end portion opposed to the end portion to be connected with the thin film transistor TFT. This overlap constitutes the hold capacitance element (i.e., the dielectric capacity element) Cadd having the transparent pixel electrode ITO1 as its one electrode PL2 and the adjoining scanning signal line GL as its other electrode PL1, as is apparent from FIG. 4. This hold capacitance element Cadd has its dielectric film formed of both the insulating film GI to be used as the gate insulating film of the thin film transistor TFT and the anodized film AOF.

The hold capacitance element Cadd is formed at the widened portion of the second conductive film g2 of the scanning signal line GL. Incidentally, the second conductive film g2 at the portion intersecting the video signal line DL is thinned to reduce the probability of short-circuiting the videos signal line DL.

Even if the transparent pixel electrode ITO1 is broken at the step of the electrode PL1 of the hold capacitance element Cadd, this defect is compensated by the island region which is formed of the second conductive film d2 and the third conductive film d3 crossing that step.

Gate Terminal

FIGS. 10(A) and 10(B) are diagrams showing a connecting structure from the scanning signal line GL of the display matrix to the external terminal GTM and presents a top plan at FIG. 10(A) and a section taken along B—B of FIG. 10(A) at FIG. 10(B). Incidentally, FIGS. 10(A) and 10(B) relate to the vicinity of the lower portion of FIG. 7, and the portion of oblique wiring lines is conveniently shown by a single line.

Letters AO designate a photographic mask pattern, i. e., a photoresist pattern for selective anodization. As a result, this photoresist is removed after the anodization, and the pattern AO, as shown, is not left in the finished product, but its locus is left because the anodized film AOF is selectively formed on the gate wiring lines, as shown in section. With reference to the boundary AO of the photoresist, as shown in the top plan view of FIG. 10(A), the lefthand region is coated with the resist and is not anodized, whereas the righthand region is exposed through the resist and is anodized. The anodized Al layer g2 is formed in its surface with its oxide $Al_2O_3$ film AOF so that the underlying conductive portion has its capacity reduced. Of course, the anodization is performed for a proper time period and under a proper voltage so as to leave the conductive portion. The mask pattern AO intersects the scanning line GL not in a single line, but in a cranked line.

The Al layer g2 is hatched, as clearly seen, but the unanodized region is patterned in a comb shape. Since the Al layer is formed with whiskers if it is wide, its individual comb teeth are narrowed and bundled as a plurality of lines disposed in parallel so as to minimize the probability of breakages and the sacrifice of conductivity while preventing the whiskers from being formed. Thus, the portion corresponding to the root of the comb is shifted along the mask AO.

The gate terminal GTM is formed of the Cr layer g1, which has a rich contacting property with the silicon oxide SiO layer and a higher anti-galvanic corrosion than Al or the like, and the transparent conductive layer d1 for protecting the surface of the Cr layer g1 and having the same level (or simultaneously formed in the same layer) as that of the transparent pixel electrode ITO1. Incidentally, the gate insulating film GI and the conductive layers d2 and d3, formed at the side faces of the former, are left, as a result of which the conductive layers g2 and g1 are so covered with the photoresist that they may not be etched off due to the pin holes at the time of etching the conductive layers d3 and d2. Moreover, this counter-measure is completed by the ITO layer d1 which is extended rightward across the gate insulating film GI.

As seen in the top plan view of FIG. 10(A), the gate insulating film GI is formed at the righthand side of the boundary, and the passivation film PSV1 is formed at the righthand side of the boundary. The terminal GTM portion located at the lefthand side is so exposed that it can be electrically connected with an external circuit. Although only one pair of the gate electrode GL and the gate terminal GTM are shown, a plurality of pairs are longitudinally arrayed as a matter of fact, as shown in FIG. 7, to form the terminal set Tg (as shown in FIGS. 6 and 7) so that the gate terminal has its lefthand end extended during the manufacture over the cut region CT1 of the substrate and is short-circuited by a wiring line SHg. This short-circuiting line SHg in the manufacture process is useful for energization at the anodizing time and for preventing the dielectric breakage at the time of rubbing the orientation film ORI1.

Drain Terminal DTM

Figures 11A, 11B:
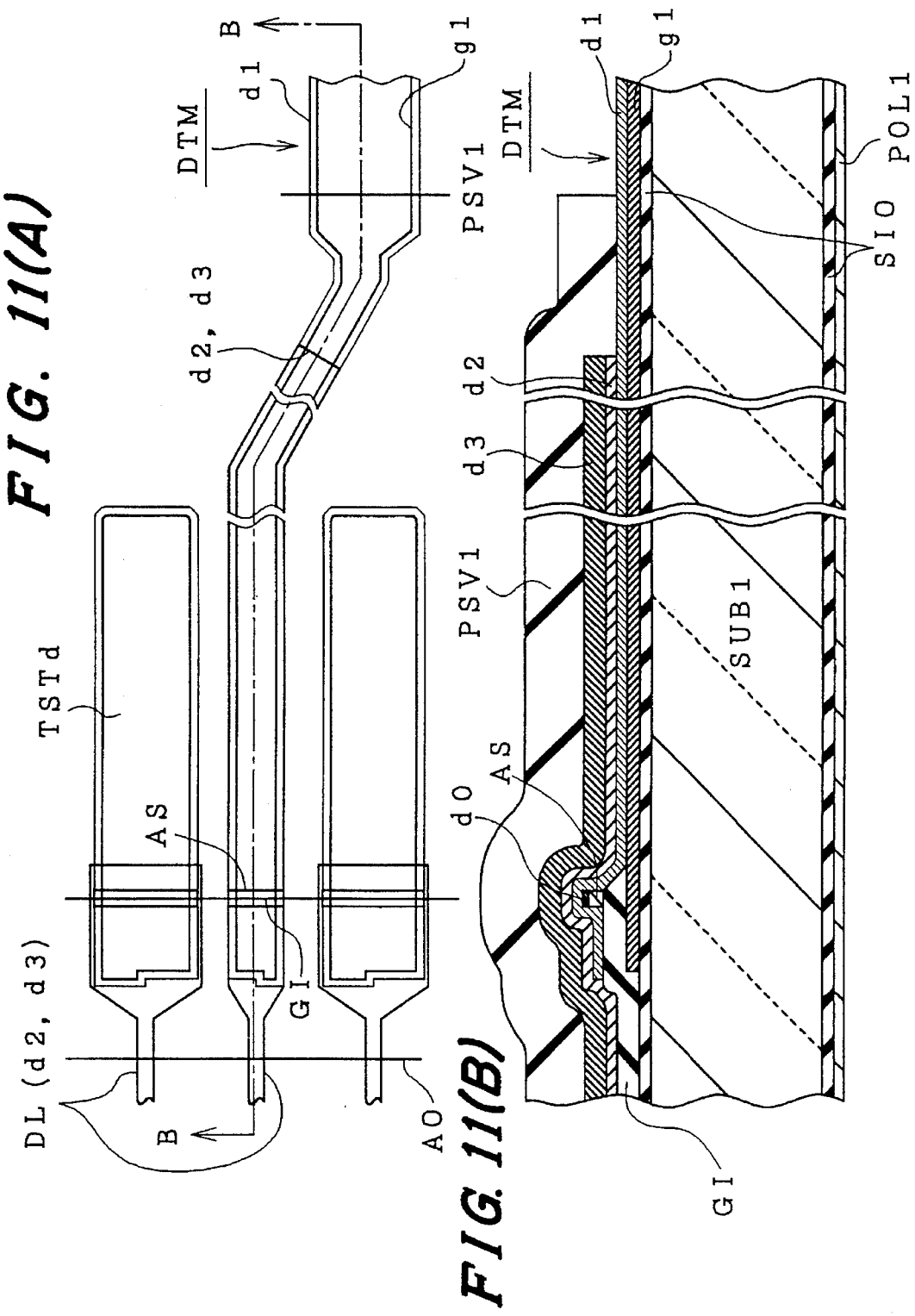
FIG. 11(A) is a top plan view showing the vicinity of the connecting portion of the drain terminal DTM and FIG. 11(B) is a section along line B—B in FIG. 11(A) showing the video signal line DL.

FIGS. 11(A) and 11(B) are diagrams showing the connection from the video signal line DL to the external terminal DTM and presents a top plan view at FIG. 11(A) and a section taken along line B—B of FIG. 11(A) at FIG. 11(B). Incidentally, FIGS. 11(A) and 11(B) relate to the vicinity of the righthand upper portion of FIG. 7, and its righthand end corresponds to the upper end portion (or the lower end portion) of the substrate SUB1, although the drawing direction is changed for convenient purposes.

Letters TSTd designate a test terminal which is not connected with any external terminal, but is made sufficiently wider than the wiring portion as to be connected with a probe or the like. Likewise, the drain terminal DTM is also made sufficiently wider than the wiring portion as to be connected with an external circuit. The test terminal TSTd and the external drain terminal DTM are alternately staggered in the longitudinal direction such that the test terminal TSTd terminates short of the end portion of the substrate SUB1, as shown. As shown in FIG. 7, on the other hand, the drain terminals DTM constitute the terminal set Td (although its suffixes are omitted) and are extended across the cut line CT1 of the substrate SUB1 so that all of them are short-circuited during the manufacturing process by wiring lines SHd so as to prevent dielectric breakages. The drain terminals are connected with the opposite sides of the video signal lines DL having the test terminals TSTd across the matrix, and the test terminals are connected with the opposite sides of the video signal lines DL having the drain terminals DTM across the matrix.

The drain terminals DTM are formed of two layers, the Cr layer G1 and the ITO layer d1, and are connected with the video signal lines DL at the portions where the gate insulating film GI is removed. The semiconductor layer AS formed over the end portion of the gate insulating film GI is provided to etch the edge of the gate insulating film GI in a tapered shape. The passivation film PSV is naturally removed from the terminal DTM so as to ensure the connection with the external circuit. Letters AO designate the aforementioned anodized mask, which has its boundary enclosing the entire matrix and is covered with the mask at the lefthand side of the boundary, as shown; but this pattern has no direct relation, because the layer g2 is not present in the not-covered portion.

The lead-out lines from the matrix portion to the drain terminal portion DTM is constructed, as shown in FIG. 8(c), such that the layers d2 and d3 at the same level as that of the video signal line DL are laminated just over the layers d1 and g1 at the same level as that of the drain terminal portion DTM midway of the seal pattern SL. This construction is intended to minimize the probability of breakages, so that the galvanically corrosive Al layer 3 may be protected as much as possible by the passivation film PSV1 and the seal pattern SL.

Equivalent Circuit of the Entire Display Device

Figure 12:
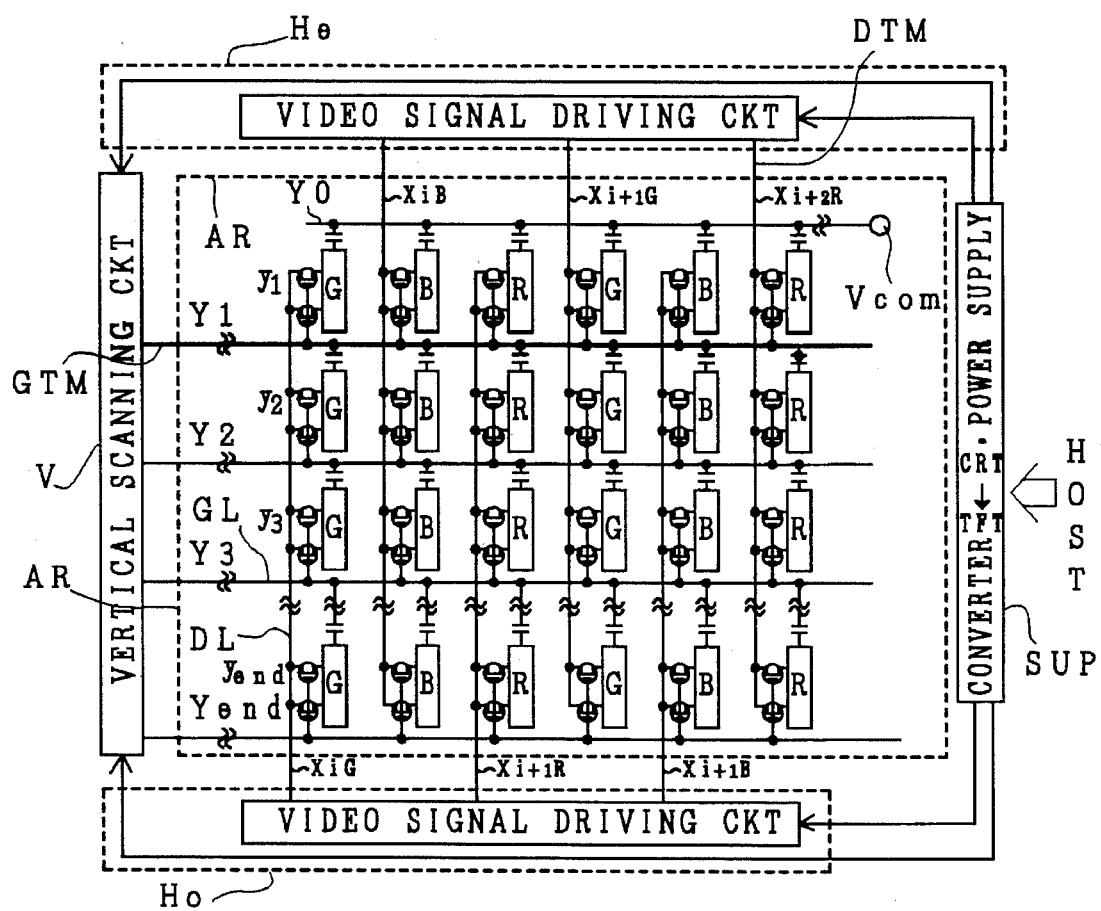
FIG. 12 is a schematic diagram showing the matrix portion and its periphery of the active matrix type color liquid crystal display device.

The connection diagram of the equivalent circuit of the display matrix portion and its peripheral circuit is presented in FIG. 12. This Figure is a circuit diagram but is drawn to correspond to the real geometric arrangement. Letters AR designate a matrix array in which a plurality of pixels are two-dimensionally arrayed.

In FIG. 12, letter X designates the video signal lines DL, and suffixes G, B and R are added to correspond to the green, blue and red pixels, respectively. Letter Y designates the scanning signal lines GL, and suffixes 1, 2, 3, . . . , are added according to the order of the scanning timings.

The video signal lines X (having their suffixes omitted) are alternately connected with an upper (or odd) video signal driving circuit He and a lower (or even) video signal driving circuit Ho.

The scanning signal lines Y (having their suffixes omitted) are connected with a vertical scanning circuit V.

Letters SUP designate a power supply for achieving a plurality of divided stable voltage sources from one power source and a circuit for converting the data coming from a host (i.e., a host processor) for the CRT (i.e., Cathode Ray Tube) into the data for the TFT liquid crystal display device.

Actions of Hold Capacity Element Cadd

The hold capacitance element Cadd acts to reduce the influences of a gate potential change $\Delta Vg$ upon an intermediate potential (i.e., a pixel electrode potential) Vlc when the thin film transistor TFT is to be switched. This action is expressed by the following Equation:

$$\Delta Vlc = \{Cgs/(Cgs+Cadd+Cpix)\} \times \Delta Vg,$$

wherein: Cgs indicates a parasitic capacitor to be established between the gate electrode GT and the source electrode SD1 of the thin film transistor TFT; Cpix indicates a capacitor to be established between the transparent pixel electrode ITO1 (PIX) and the common transparent pixel electrode ITO2 (COM); and $\Delta Vlc$ indicates a change in the pixel electrode potential due to $\Delta Vg$. This change $\Delta Vlc$ will cause a DC component to be applied to the liquid crystal LC, but can be made lower as the hold capacitor Cadd is made higher. On the other hand, the hold capacitance element Cadd also acts to elongate the discharge time period and to store the video data for a long time after the thin film transistor TFT is turned OFF. The reduction in the DC component to be applied to the liquid crystal LC can improve the lifetime of the liquid crystal LC and can reduce so-called "printing" in which the preceding image is left when the liquid crystal display frame is switched.

As has been described above, the gate electrode GT is enlarged to cover the i-type semiconductor layer AS completely, thereby to increase the overlap area between the source electrode SD1 and the drain electrode SD2, so that the parasitic capacitor Cgs is increased to cause an adverse effect that the intermediate potential Vlc becomes susceptible to the influences of a gate (scanning) signal Vg. This demerit can be eliminated by providing the hold capacity element Cadd.

The hold capacitance of the hold capacitance element Cadd is set to a value four to eight times (4.Cpix<Cadd<8.Cpix) as high as that of the liquid crystal element Cpix and eight to thirty-two times (8 ECgs Cadd<32.Cgs) as high as that of the parasitic capacitor Cgs.

The first step scanning signal line GL (Y0), to be used only as the hold capacitor electrode line, is set at the same potential as that of the common transparent pixel electrode ITO2 (at Vcom). In the embodiment of FIG. 7, the scanning signal line at the first step is short-circuited to the common electrode COM through the terminal GTO, the lead-out line INT, the terminal DTO and the external wiring line. Alternatively, the hold capacitor electrode line Y0 at the first step may be connected with a scanning signal line Y end at the final step, or to a DC potential point (or an AC ground point) other than Vcom, or it may be connected to receive one more scanning pulse Y0 from the vertical scanning circuit V.

Manufacturing Method

Next, the method of manufacturing the substrate SUB1 of the aforementioned liquid crystal display device will be described with reference to FIGS. 13 to 15. In these Figures, letters appearing at the center indicate abbreviations of the step names, and the lefthand sides indicate the pixel portion shown in FIG. 3; whereas, the righthand sides indicate the flows of treatments of the vicinity of the gate terminal of FIG. 10(a) in section. Steps A to I, excepting Step D, are divided to correspond to the individual photographic treatments, and their individual sections show the steps at which the photoresists are removed after the photographic treatments. Incidentally, these photographic treatments inudue a series of steps from the applications of the photoresists through the selective exposures using the masks to the developments, and their repeated description will be omitted. The manufacturing method will be described in the following in accordance with the divided steps.

Figure 13:
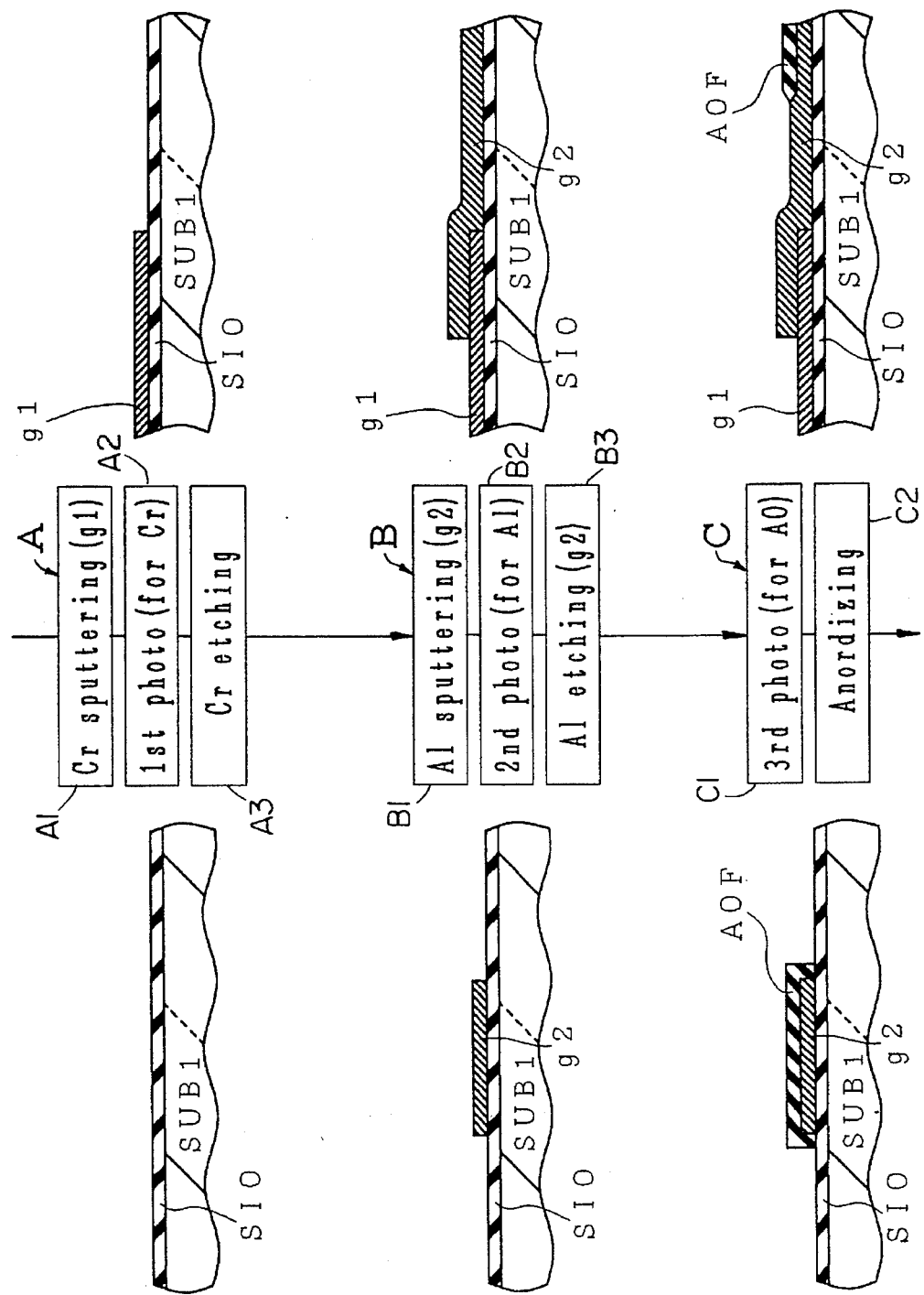
FIG. 13 is a flow chart showing sections of the pixel portion and the gate terminal portion, including Steps A to C for manufacturing the substrate SUB1.

Step A, FIG. 13

The lower transparent glass substrate SUB1 made of 7059 glass (known as the trade name) has its two faces dipped with the silicon oxide films SIO and is baked at 500 for 60 minutes. The lower transparent glass substrate SUB1 is sputtered over with the first conductive film g1 of chromium having a thickness of 1,100 angstroms (step A1). After the photographic treatment (step A2), the first conductive film g1 is selectively etched with an etching liquid of a solution of ammonium ceric nitrate (step A3). As a result, there are formed the gate terminal GTM, the drain terminal DTM, the anodized bus line SHg for connecting the gate terminal GTM, the bus line SHd for short-circuiting the drain terminal DTM, and the (not-shown) anodized pad connected with the anodized bus line SHg.

Step B, FIG. 13

The second conductive film g2 made of Al—Pd, Al—Si, Al—Si—Ti, Al—Si—Cu or the like and having a thickness of 2, 800 angstroms is formed by the sputtering method (step B1). After the photographic treatment (step B2), the second conductive film g2 is selectively etched with a mixed acid solution of phosphoric acid (step B3), nitric acid and glacial acetic acid.

Step C, FIG. 13

After the photographic treatment (step C1) (i.e., after the aforementioned anodized mask AO has been formed), the substrate SUB1 is dipped (step C2) in an anodizing solution, which is prepared by diluting a solution of 3% of tartaric acid and ammonia having a PH of 6.25±0.05 with an ethylene glycol solution to 1:9, to have a formation current density of 0.5 mA/cm$^2$ (i.e., a constant current formation). Next, an anodization is performed till the formation voltage reaches a level of 125 v necessary for achieving a predetermined Al$_2$O$_3$ film thickness. After this, the anodized substrate SUB1 is desirably held in this state for several tens of minutes (i.e., a constant voltage formation). This treatment is essential for achieving a uniform Al$_2$O$_3$ film. As a result, the conductive film g2 is anodized to form the anodized film AOF having a thickness of 1,800 angstroms over the scanning signal line GL, the gate electrode GT and the electrode PL1.

Figure 14:
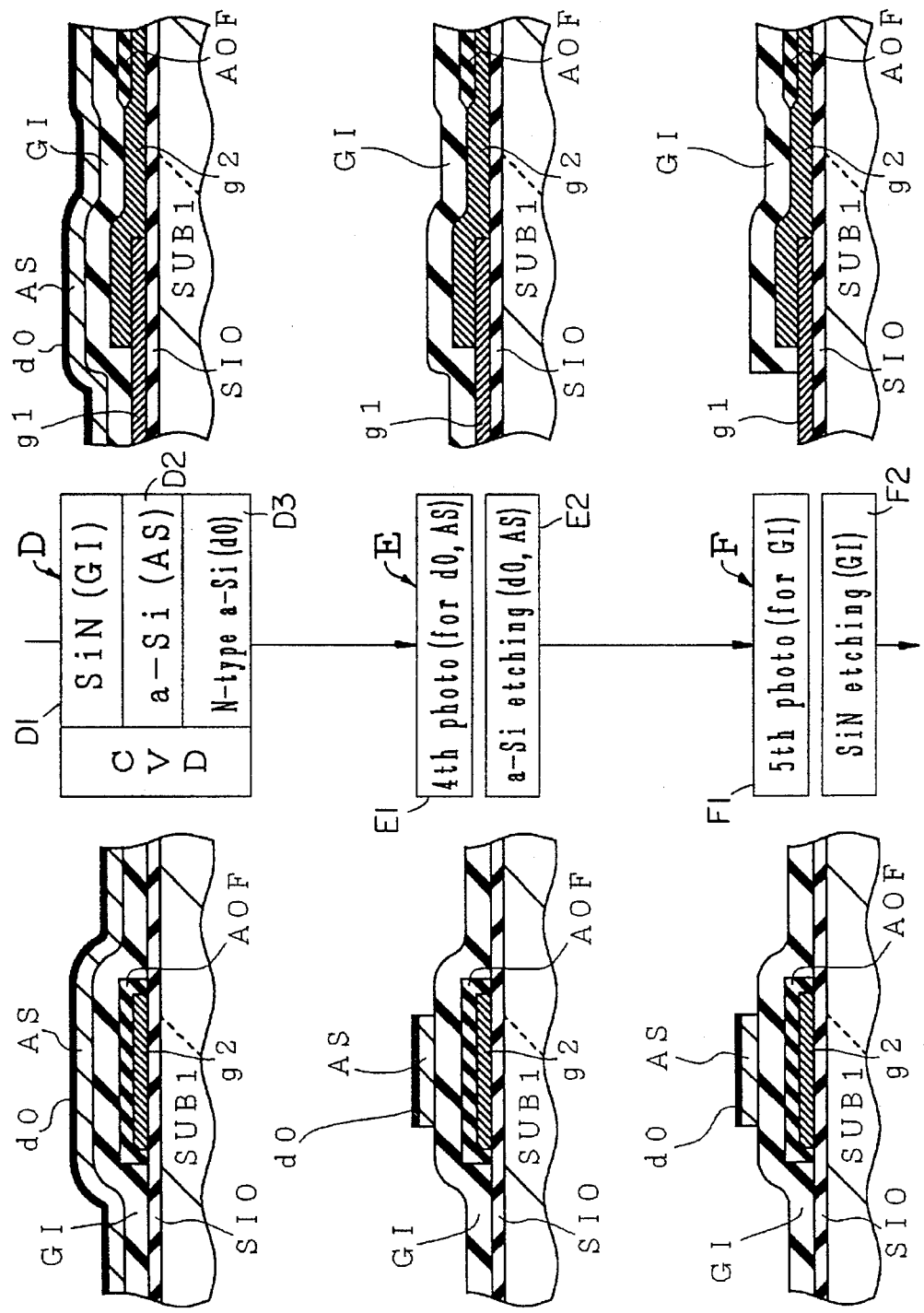
FIG. 14 is a flow chart of sections of the pixel portion and the gate terminal portion, including Steps D to F for manufacturing the substrate SUB1.

Step D, FIG. 14

Ammonia gas, silane gas and nitrogen gas are introduced into the plasma CVD apparatus (step D1) to form a silicon nitride film having a thickness of 2,000 angstroms, and silane gas and hydrogen gas are introduced into the plasma CVD apparatus (step D2) to form an i-type amorphous Si film having a thickness of 2,000 angstroms. After this, hydrogen gas and phosphine gas are introduced into the plasma CVD apparatus (step D3) to form an N(+)-type amorphous Si film having a thickness of 300 angstroms.

Step E, FIG. 14

After the photographic treatment (step E1), SF$_6$ and CCl$_4$ are used as the dry etching gas to etch the N(+)-type amorphous Si film and the i-type amorphous Si film selectively (step E2) thereby to form an island of the i-type semiconductor layer AS.

Step F, FIG. 14

After the photographic treatment (step F1), SF$_6$ is used as the dry etching gas to etch the silicon nitride film selectively (step F2).

Figure 15:
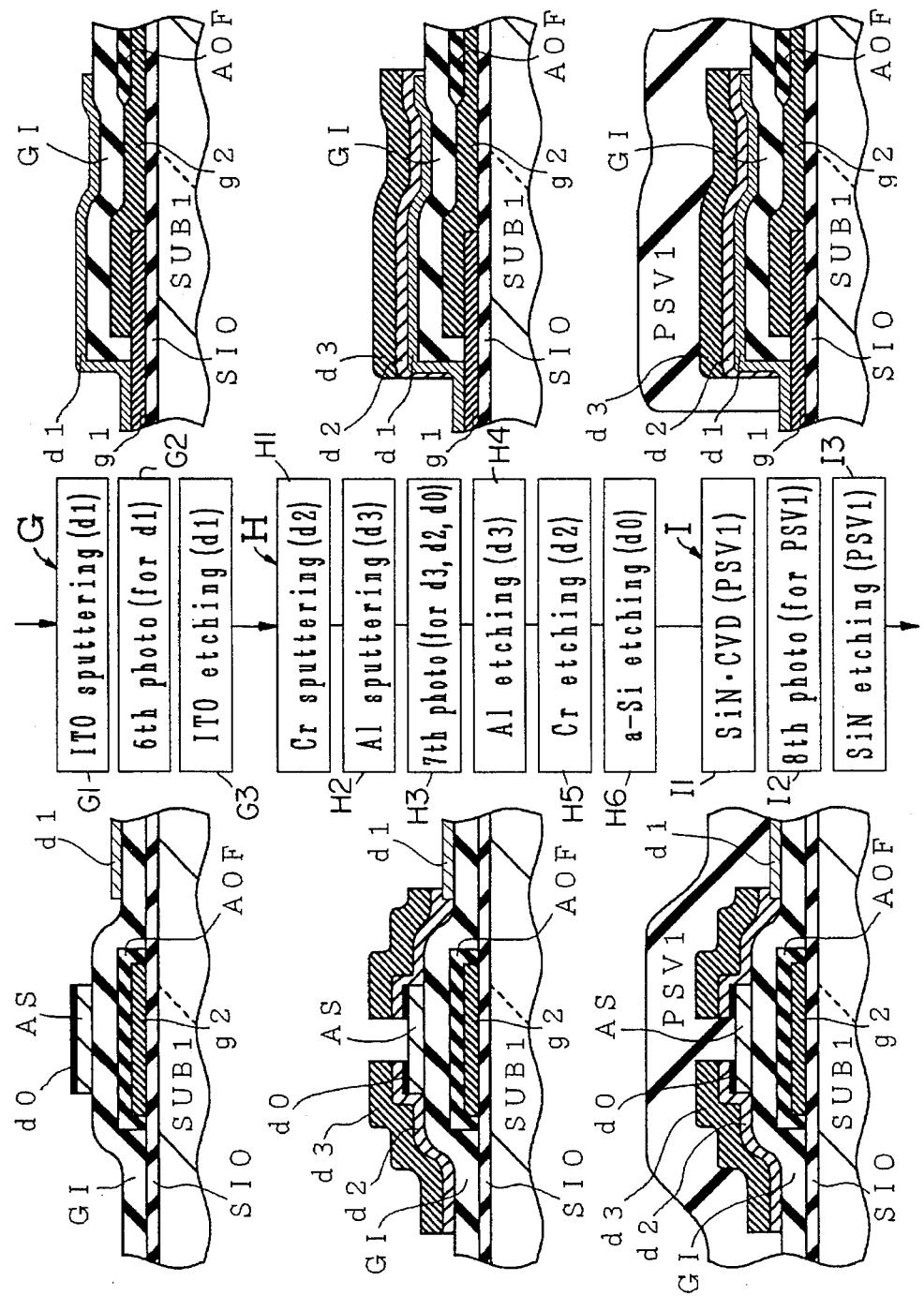
FIG. 15 is a flow chart of sections of the pixel portion and the gate terminal portion, including Steps G to I for manufacturing the substrate SUB1.

Step G, FIG. 15

The first conductive film d1 made of an ITO film having a thickness of 1,400 angstroms is formed by the sputtering method (step G1). After the photographic treatment (step G2), the first conductive film d1 is selectively etched with an etching liquid of a mixed acid solution of hydrochloric acid (step G3) and nitric acid, to form the uppermost layer of the gate terminal GTM and the drain terminal DTM and the transparent pixel electrode ITO1.

Step H, FIG. 15

The second conductive film d2 made of Cr and having a thickness of 600 angstroms is formed by the sputtering method (step H1), and the third conductive film d3 having a thickness of 4,000 angstroms and made of Al—Pd, Al—Si, Al—Si—Ti, Al— Si—Cu or the like is formed by the sputtering method (step H2). After the photographic treatment (step H3), the third conductive film d3 is etched (step H4) with a liquid similar to that used in Step B3 (FIG. 13), and the second conductive film d2 is etched (step H5) with a liquid similar to that used in Step A3 (FIG. 13), to form the video signal line DL, the source electrode SD1 and the drain electrode SD2. Next, $CCl_4$ and $SF_6$ are introduced into the dry etching apparatus (step H6) to etch the N(+)-type amorphous Si film thereby to remove the N(+)-type semiconductor layer d0 between the source and the drain selectively.

Step I, FIG. 15

Ammonia gas, silane gas and nitrogen gas are introduced into the plasma CVD apparatus (step I1) to form a silicon nitride film having a thickness of 1 µm. After the photographic treatment(step I2), the silicon nitride film is selectively etched (step I3) by photolithography using $SF_6$ as the dry etching gas to form the passivation film PSV1.

Overall Construction of Liquid Crystal Display Module

Figure 16:
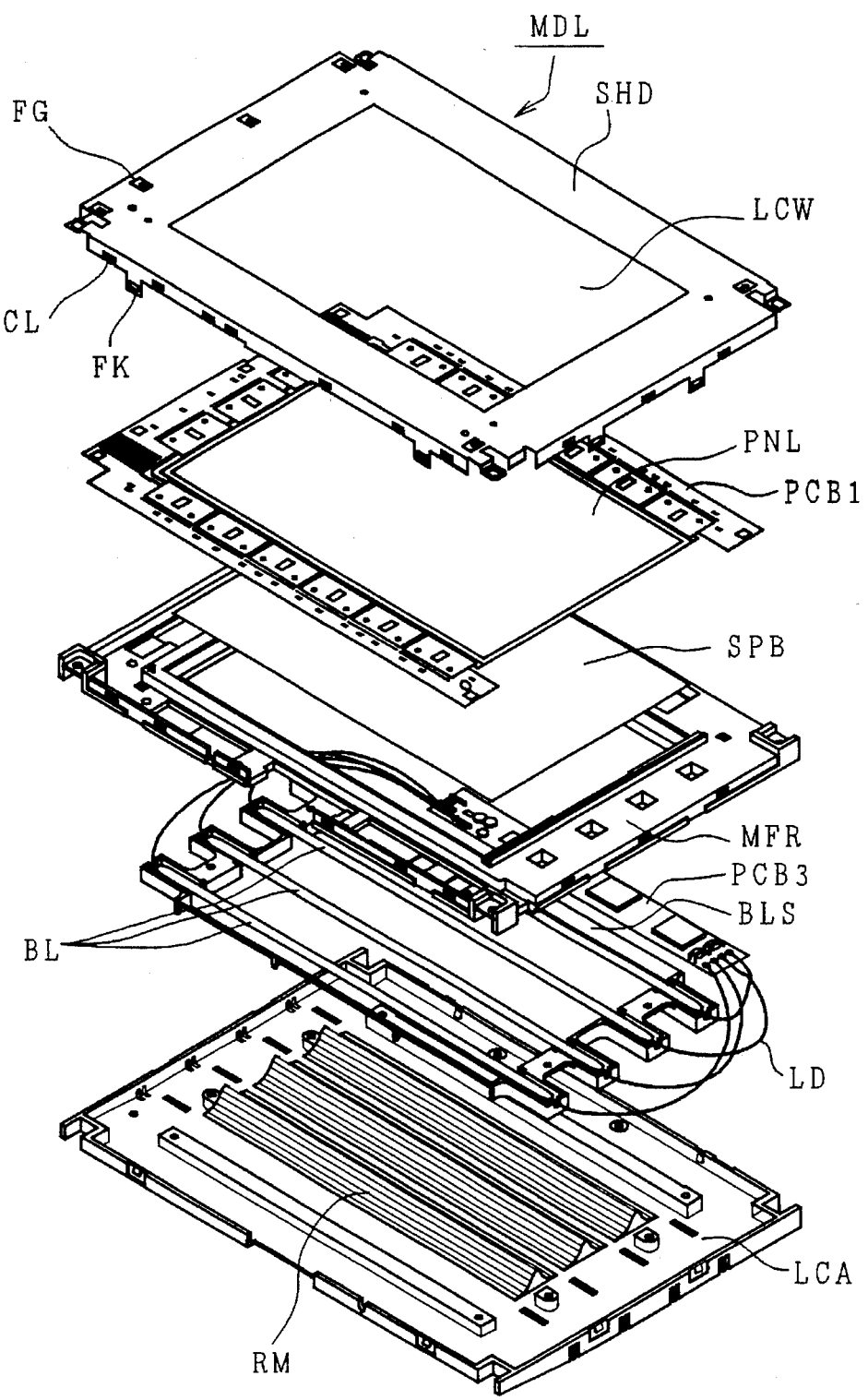
FIG. 16 is an exploded perspective view showing the liquid crystal display module.

FIG. 16 is an exploded perspective view showing the individual parts of the liquid crystal display module MDL.

Letters SHD designate a framed shield casing (or metal frame) made of metal sheets; letters LCW designate a display window; letters PNL designate a liquid crystal display panel; letters SPB designate an optical diffusion board; letters MFR designate a middle frame; letters BL a back light; letters BLS designate a back light support; and letters LCA designate a lower casing. These members are stacked in a vertical arrangement, as shown, to assemble the module MDL.

The module MDL is fixed at its periphery by claws CL and hooks FK which are formed at the shield casing SHD.

The middle frame MFR is so framed as to form an opening corresponding to the display window LCW and is formed with corrugations corresponding to the shapes and thicknesses of the back light support BLS and other various circuit parts and with radiating openings.

The lower casing LCA also acts as a reflector for the back light and is formed with reflecting pyramids RM corresponding to the fluorescent lamps BL so as to effect efficient reflections.

Display Panel PNL and Driving Circuit Substrate PCB1

Figure 17:
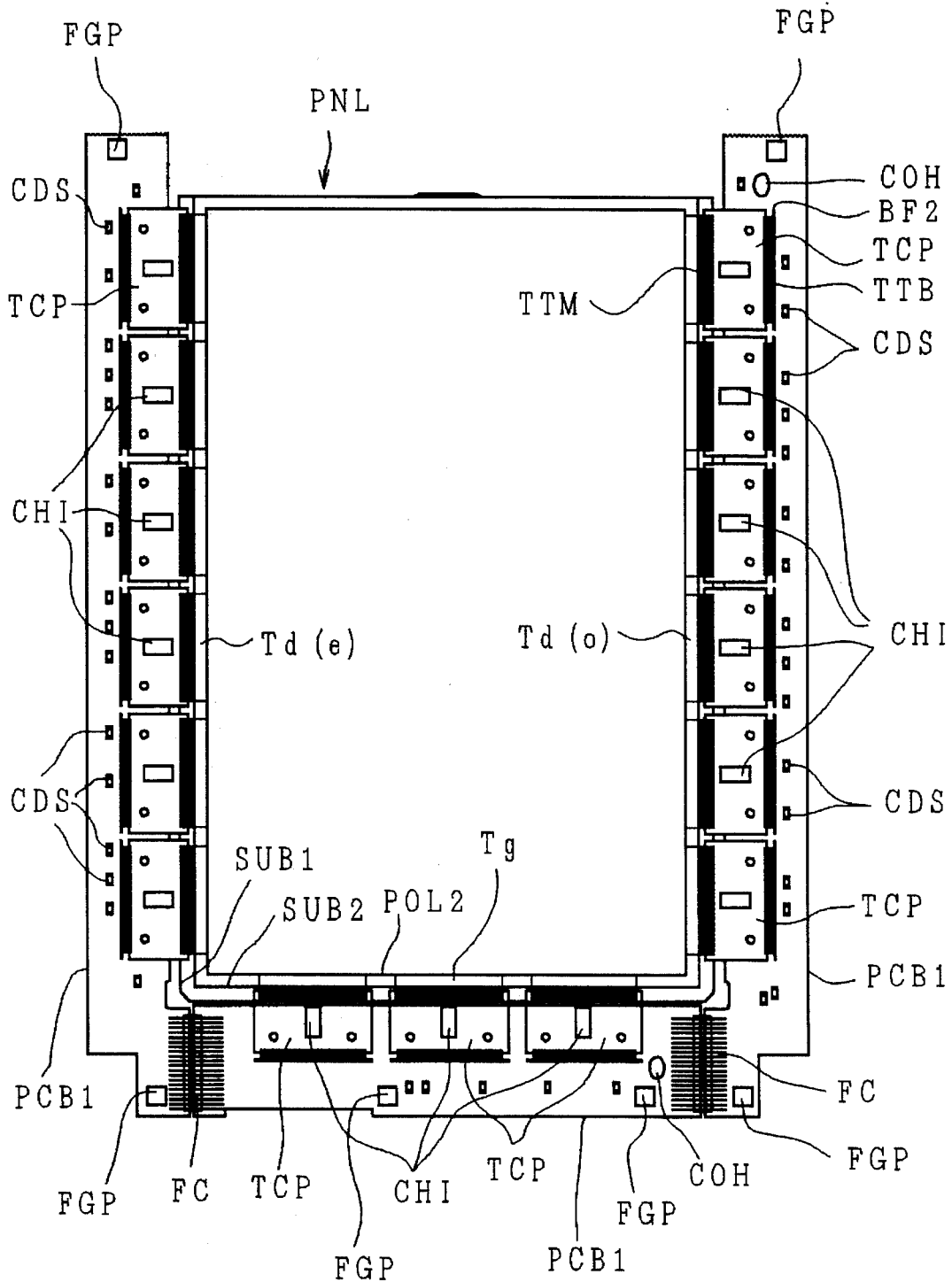
FIG. 17 is a top plan view showing the state in which peripheral driving circuits are packaged in the liquid crystal display panel.

FIG. 17 is a top plan view showing the state in which the video signal driving circuits He and Ho and the vertical scanning circuit V are connected with the display panel PNL, as shown in FIG. 5 or the like.

Letters CHI designate driving IC chips (of which the lower three are the driving IC chips at the side of the vertical scanning circuit, whereas the transverse six are the driving IC chips at the side of the video signal driving circuit) for driving the display panel PNL. Letters TCP designate a tape carrier package in which the driving IC chips CHI are packaged by the tape automated bonding (TAB) method, as will be described with reference to FIGS. 18 and 19, and the letters PCB1 designate three divided driving circuit substrates in which the aforementioned TCP, a capacitor CDS and the like are packaged. Letters FGP designate a frame ground pad, to which is soldered a spring-shaped fragment FG formed by cutting the shield casing SHD. Letters FC designate a flat cable for connecting the lower driving circuit substrate PCB1 and the lefthand driving circuit substrate PCB1 electrically and for connecting the lower driving circuit substrate PCB1 and the righthand driving circuit substrate PCB1 electrically. The flat cable FC used is prepared by sandwiching a plurality of lead lines (made of a phosphor bronze plated with Sn) between a striped polyethylene layer and a polyvinyl alcohol layer.

Connecting Structure of TCP

FIG. 18 is a section showing a sectional structure of the tape carrier package TCP which constitutes the scanning signal driving circuit V and the video signal driving circuits He and Ho and on which the integrated circuit chip CHI is packaged in the flexible wiring substrate, and FIG. 19 is a section of an essential portion showing the state in which the tape carrier package TCP is connected to the video signal circuit terminal DTM, in the present embodiment of the liquid crystal display panel.

In the same Figures, letters TTB designate an input terminal/wiring line portion of the integrated circuit CHI, and letters TTM designates an output terminal/wiring line portion of the integrated circuit CHI. These terminals TTB and TTM are made of Cu, for example, and have their individual inner leading end portions (usually called the "inner leads") connected with the bonding pads PAD of the integrated circuit CHI by the so-called "face-down bonding method". The terminals TTB and TTM have their outer leading end portions (usually called the "outer leads") corresponding to the input and output of the semiconductor integrated circuit chip CHI, respectively, and connected with the CRT/TFT converter/power supply SUP by means of solder and with the liquid crystal display panel PNL by an anisotropic conductive film ACF. The package TCP is so connected to the panel that its leading end portion may cover the passivation film PSV1 having the connecting terminal DTM exposed at the side of the panel PNL. As a result, the external terminal DTM (or GTM) is strong against galvanic corrosion because it is covered with at least one of the passivation film PSV1 or the package TCP.

Letters BF1 designate a base film made of polyimide or the like, and letters SRS designate a solder resist film for masking to keeping any unnecessary portion clear of the solder at the soldering time. The gap between the upper and lower glass substrates outside of the seal pattern SL is protected, after being cleaned, with an epoxy resin EPX or the like, and the gap between the package TCP and the upper substrate SUB2 is filled up with a silicone resin SIL to multiply the protection.

Driving Circuit Substrate PCB2

Figure 20:
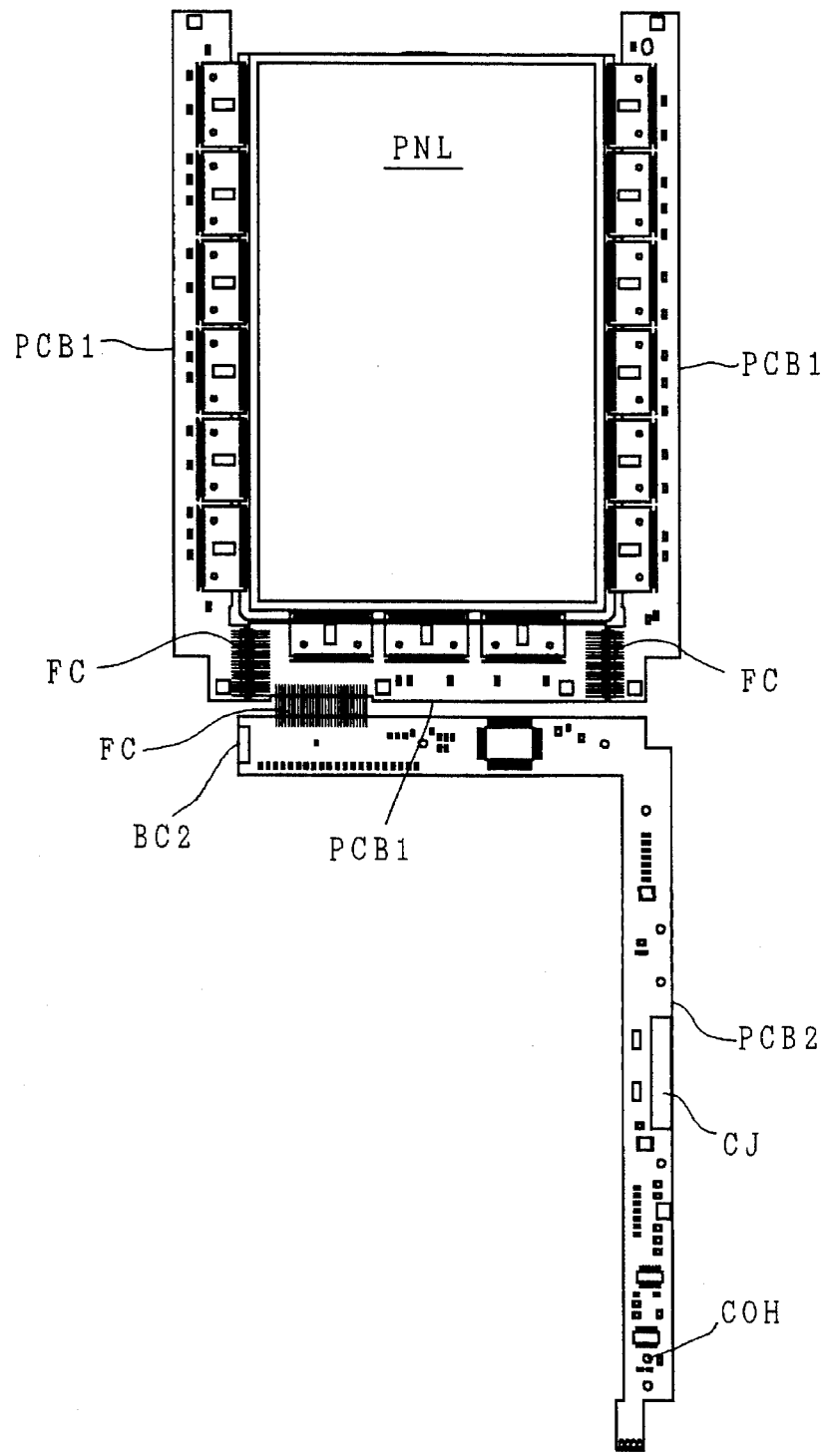
FIG. 20 is a top plan view showing the state in which the peripheral driving circuit substrate PCB1 (the upper side of which is seen) and the power supply circuit substrate PCB2 (the lower side of which is seen) are connected.

A liquid crystal display portion LCD to be held/housed in the middle frame MFR has its driving circuit substrate PCB2 formed into the shape of the letter "L", as shown in FIG. 20, to package the electronic parts, such as the IC, capacitors and resistors. In this driving circuit substrate PCB2, there is packaged the circuit SUP including a power supply circuit for establishing a plurality of divided stable voltage sources from one voltage source, and a circuit for converting the data for the CRT (i.e., Cathode Ray Tube) from the host (i.e., the host processor) into the data for the TFT liquid crystal display device. Letters CJ designate a connector connecting portion, with which is connected the not-shown connector to be connected with the outside. The driving circuit substrate PCB2 and the inverter circuit substrate PCB3 are electrically connected by the back light cable through the connector holes formed in the middle frame MFR.

The driving circuit substrate PCB1 and the driving circuit substrate PCB2 are electrically connected through the foldable flat cable FC. At the time of assembly, the driving circuit substrate PCB2 is superposed on the back of the driving circuit substrate PCB1 by folding the flat cable FC by 180 degrees and is fitted in a predetermined recess of the middle frame MFR.

Although the present invention has been described in connection with a particular embodiment, it should not be limited thereto but can be applied to a display device using electroluminescence and thin film transistors. Moreover, the management symbol NO may be made of the same Al material as that of the gate electrode GT.

According to the embodiment of the present invention, the management symbols, such as the type, lot number and production number of the active matrix liquid crystal display panel, can be displayed without any increase in the number of steps in the manufacturing process.

Moreover, since the Cr management symbol NO formed at the first patterning step is coated with the gate insulating film GI, it is not removed at the time of Cr etching another layer for the source and drain electrodes. Still moreover, since the management symbol is drawn on the photoresist RST by making use of an X-Y plotter, different symbols can be easily formed for individual panels.

What is claimed is:

1. A liquid crystal display device having a thin film transistor comprising:
   an insulating substrate;
   a first-level conductive layer formed over said substrate and constituting a gate electrode of said transistor;
   a first-level insulating layer formed over said first-level conductive layer;
   a semiconductor layer which is formed over said first-level insulating layer and at which an active region is formed;
   a second-level conductive layer forming source and drain electrodes over said semiconductor layer; and
   a management symbol pattern formed over said substrate and having an opaque conductive film covered with said first-level insulating layer and containing material which is included in said second-level conductive layer and is different from material included in said first-level conductive layer.

2. A liquid crystal display device, as set forth in claim 1, wherein a management symbol pattern is formed at a first pattern forming step.

3. A liquid crystal display device, as set forth in claim 1, wherein said opaque conductive film is a layer forming an external terminal.

4. A liquid crystal display device, as set forth in claim 1, wherein said opaque conductive film is comprised of a material which is soluble in the same etchant as said second-level conducting layer.

5. A liquid crystal display device, as set forth in claim 1, wherein said management symbol pattern forms a production number.

6. A liquid crystal display device as set forth in claim 1, wherein said management symbol pattern forms a lot number.

7. A liquid crystal display device, as set forth in claim 1, further including a second-level insulating film covering said source, said drain electrode, said active region and said management symbol pattern.

8. A liquid crystal display device, as set forth in claim 1, wherein said opaque conductive film is a same level layer as that of said first-level conductive layer.

9. A liquid crystal display device, as set forth in claim 8, wherein said opaque conductive film is comprised of a material which is soluble in the same etchant as said second-level conducting layer.

10. A liquid crystal display device, as set forth in claim 9, further including a second-level insulating film covering said source, said drain electrode, said active region and said management symbol pattern.

11. A liquid crystal display device, as set forth in claim 8, wherein said opaque conductive film is a layer forming an external terminal.

12. A liquid crystal display device, as set forth in claim 8, wherein said management symbol pattern forms both a production number and a lot number.

* * * * *